US 6,376,628 B1

(12) United States Patent
Ikai et al.

(10) Patent No.: US 6,376,628 B1
(45) Date of Patent: Apr. 23, 2002

(54) PROCESS FOR POLYMERIZATION OF ALPHA-OLEFIN AND ALPHA-OLEFIN POLYMER

(75) Inventors: Shigeru Ikai; Hiroyuki Ikeuchi; Yasuhisa Sakakibara; Hiroshi Satoh, all of Ichihara (JP)

(73) Assignee: Grand Polymer Co., Ltd. (JP)

( * ) Notice: Subject to any disclaimer, the term of this patent is extended or adjusted under 35 U.S.C. 154(b) by 0 days.

(21) Appl. No.: 09/314,386

(22) Filed: May 19, 1999

(30) Foreign Application Priority Data

May 21, 1998 (JP) ........................................... 10-139987
Nov. 12, 1998 (JP) ........................................... 10-322708

(51) Int. Cl.⁷ ................................................. C08F 4/16
(52) U.S. Cl. ........................ 526/128; 526/136; 526/159; 526/125.3; 526/125.1; 526/123.1; 526/124.3; 526/127; 526/126; 526/348; 502/116; 502/103; 502/133; 502/104
(58) Field of Search ................................. 526/128, 136, 526/159, 125.3, 125.1, 123.1, 124.3, 127, 126, 348; 502/116, 103, 133, 104

(56) References Cited
U.S. PATENT DOCUMENTS

| 4,547,476 A | 10/1985 | Terano et al. ................. 502/127 |
| 4,547,552 A | 10/1985 | Toyota et al. ................. 525/247 |

(List continued on next page.)

FOREIGN PATENT DOCUMENTS

| EP | 0841348 | 11/1997 |
| EP | 0841348 | 5/1998 |

(List continued on next page.)

OTHER PUBLICATIONS

Yano et al., Journal of Polymer Science: Part A: Polymer Chemistry, vol. 26, 457–464 (1988).*

(List continued on next page.)

*Primary Examiner*—David W. Wu
*Assistant Examiner*—Ling-Siu Choi
(74) *Attorney, Agent, or Firm*—Webb Ziesenheim Logsdon Orkin & Hanson, P.C.

(57) ABSTRACT

A method for preparing an α-olefin polymer comprising the step of polymerizing or copolymerizing an α-olefin in the presence of a catalyst containing a solid catalyst constituent (A) which contains magnesium, titanium, a halogen element and an electron donor, an organoaluminum compound constituent (B), an organosilicon compound constituent (C) represented by the following general formula (1); and an organosilicon compound constituent (D) represented by the following general formulas (2) or (3) to prepare an α-olefin polymer $$R_nSi(OR)_{4-n} \quad (1)$$

Figure 1:
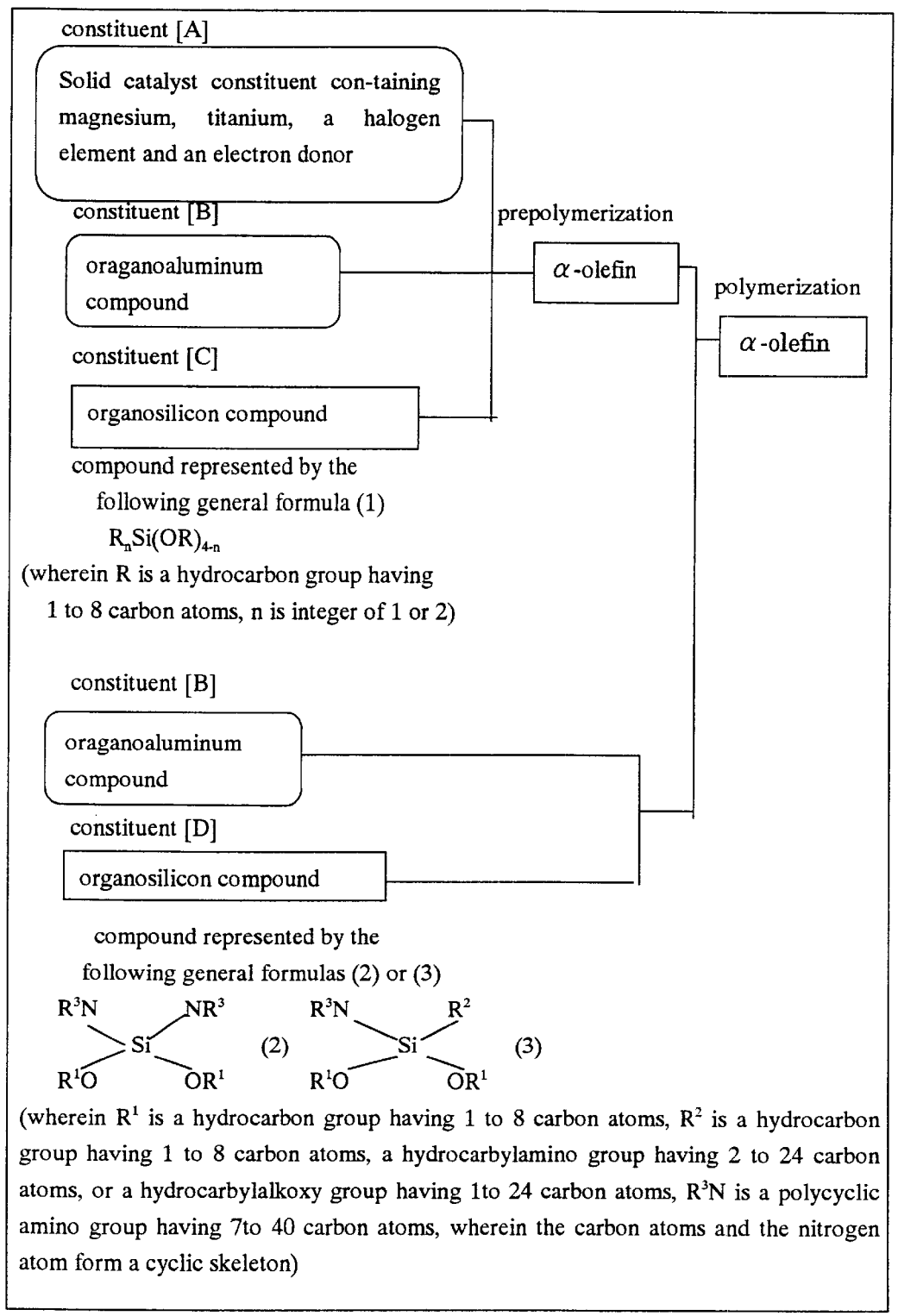

wherein R is a hydrocarbon group having 1 to 8 carbon atoms, n is integer of 1 or 2;

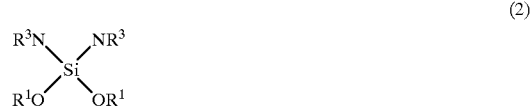

(2)

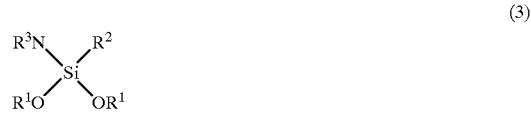

(3)

wherein $R^1$ is a hydrocarbon group having 1 to 8 carbon atoms, $R^2$ is a hydrocarbon group having 1 to 8 carbon atoms, a hydrocarbylamino group having 2 to 24 carbon atoms, or a hydrocarbylalkoxy group having 1 to 24 carbon atoms, $R^3N$ is a polycyclic amino group having 7 to 40 carbon atoms, wherein the carbon atoms and the nitrogen atom form a cyclic skeleton.

5 Claims, 2 Drawing Sheets

U.S. PATENT DOCUMENTS

| | | | |
|---|---|---|---|
| 4,829,038 A | | 5/1989 | Hoppin et al. ............... 502/125 |
| 4,970,280 A | | 11/1990 | Chiba et al. .................. 526/65 |
| 4,990,479 A | * | 2/1991 | Ishimaru et al. ............ 502/125 |
| 5,140,062 A | | 8/1992 | Chiba et al. .................. 525/53 |
| 5,166,340 A | | 11/1992 | Stewart ...................... 540/450 |
| 5,438,110 A | | 8/1995 | Ishimaru et al. ............ 526/125 |
| 5,539,067 A | * | 7/1996 | Parodi et al. ............ 526/125.3 |
| 5,618,771 A | | 4/1997 | Parodi et al. ............... 502/127 |

FOREIGN PATENT DOCUMENTS

| | | | |
|---|---|---|---|
| GB | 2130225 | | 9/1983 |
| JP | 6211705 | | 1/1987 |
| JP | 2232207 | | 9/1990 |
| JP | 4202505 | | 7/1992 |
| JP | 4370103 | | 12/1992 |
| JP | 6025336 | | 2/1994 |
| JP | 0797411 | | 4/1995 |
| JP | 7090012 | | 4/1995 |
| JP | 07-173212 | * | 7/1995 |
| JP | 7173212 | | 7/1995 |
| JP | 8120021 | | 5/1996 |
| JP | 8143621 | | 6/1996 |
| JP | 08-143621 | * | 6/1996 |
| JP | 8231663 | | 9/1996 |
| JP | 08-301920 | * | 11/1996 |
| JP | 09-278819 | * | 10/1997 |
| WO | 9730096 | | 8/1997 |

OTHER PUBLICATIONS

Yasushi Nakayama. "Stereospecific polymerization catalysts for olefins and manufacture of propylene polymers," Chemical Abstracts. vol. 131, Columbus. Ohio. US; and JP 11 147907 A (Mitsui Chemicals Inc., Japan) 1997.

Shigeru Igai et al., "High–activity and stereoregular catalysts for polymerization of alpha–olefins"; Chemical Abstracts, vol. 125, Columbus, Ohio, US; and JP 08 120021 A (UBE Industries, Japan) May 14, 1996.

* cited by examiner injection-modeled plate
(thickness 3 mm)

PROCESS FOR POLYMERIZATION OF ALPHA-OLEFIN AND ALPHA-OLEFIN POLYMER

BACKGROUND OF THE INVENTION

1. Field of the Invention

The present invention is directed to a process for preparing a homopolymer of α-olefin or a copolymer of α-olefin with other α-olefins, having high hydrogen sensibility, high catalyst activity, and high polymer stereoregularity together with wide molecular weight distribution of α-olefin polymers, by using a novel combination of organosilicon compounds having the specific molecular structure as one of the catalyst constituents: The invention also relates to the α-olefin polymers (including homopolymers and copolymers) prepared by said process and the novel combination of organosilicon compounds as the catalyst constituent used for said process. The α-olefin polymers prepared by said process has a high viscoelasticity and thus an excellent film-moldability ; furthermore, an injection-molded product is free from the problem relating to poor external appearance such as flow marks.

2. Description of the Related Art

In recent years, in JP-A-57-63310, JP-A-58-83016, JP-A-59-58010, JP-A-60-44507 and others, there have been proposed, for polymerization of α-olefin, a number of highly active carrier-supported type catalyst systems comprising solid constituents containing indispensably magnesium, titanium, a halogen element and an electron donor, an organometal compound of a metal of I–III groups in Periodic Table, and an electron donor. Further, in JP-A-62-11705, JP-A-63-259807, JP-A-2-84404, JP-A-4-202505 and JP-A-4-370103, there have been disclosed other polymerization catalysts characterized by containing a specific organosilicon compound as an electron donor.

However, propylene polymers prepared by using a carrier-supported type catalyst system containing said organosilicon compound are generally having a narrow molecular weight distribution, and a low viscoelasticity when said polymers are melted. For those reasons such polymers often show defects in the molding properties as well as external appearances of the molded products, depending upon the applications thereof. In order to improve these defects, there have been proposed some methods in JP-A-63-245408, JP-A-2-232207 and JP-A4-370103, to spread the molecular weight distribution of polymer by polymerizing propylene in plural numbers of polymerization vessels, or by multiple-stage polymerization.

However, such methods require complicated operations, and the production speed should be inevitably lowered, thus, those methods are not industrially preferable due to the problems inclusive of production cost. Furthermore, in case of preparing a propylene polymer having a low molecular weight and a broad molecular weight distribution by using a plural number of polymerization vessels, a polymer having a low molecular weight should be prepared by use of an excessive amount of a chain transfer agent, for example hydrogen gas, in one of the polymerization vessels, resulting in higher polymerization pressure. Since the polymerization temperature should be lowered in case of a polymerization vessel which inevitably has a limitative pressure resistance, such method may cause adverse effects to the production speed.

Additionally, in JP-A-8-120021, there is disclosed a process for polymerization of an α-olefin by using, as the constituent of catalyst, an alkyl cyclic aminosilane compound represented by the general formula $R^1Si(OR^2)_2R^3$ (wherein $R^1$ is an alkyl group, and $R^3$ is a cyclic amino group). However, only compounds whose $R^1$ is methyl group are disclosed as the illustrative compounds of the alkyl cyclic aminosilane compounds. Moreover, it is quite silent as to the molecular weight distribution of the propylene polymers thus prepared by using those compounds as the constituent of catalyst.

Further, in JP-A-8-143621, there is disclosed a process for polymerization of an α-olefin by using a bis cyclic aminosilane compound having two cyclic amino groups on the silicone atom specifically disclosed therein. Specifically disclosed this cyclic compound is a bis aminosilane compound having two single ring piperidino groups as cyclic amino groups. Similar to the above, there is no concrete description as to the molecular weight distribution of the propylene polymers prepared by use of said compounds as the constituent of catalyst.

Further, in EP-A-410443, there is disclosed bis(4-methylpiperidyl)dimethoxysilane usable for a process for polymerizing an α-olefin. However, there is no concrete description as to the molecular weight distribution of a poly-α-olefin obtainable therefrom, either.

Further, in JP-A-7-90012 and JP-A-7-97411, there are disclosed processes for polymerization of an α-olefin by use of a silane compound having the substituent of nitrogen atom-containing heterocyclic group, wherein any one of carbon atoms in the heterocyclic structure is bonded directly to the silicon atom. However, there are no concrete description relating to the molecular weight distribution of the polymers prepared by using said compound.

On the other hand, it is proposed that a propylene polymer having broad molecular weight distribution and high crystallizability can be obtained by means of melt-mixing in the predetermined ratio, a propylene polymer having low molecular weight and high crystallizability with a propylene polymer having high molecular weight and high crystallizability; each one of those propylene polymers as the starting materials having been prepared by conventional processes before the melt-mixing. However, in case that molecular weight of a propylene polymer having low molecular weight is very different from that of a propylene polymer having high molecular weight, it is practically very difficult to run the melt-mixing operation of a propylene polymer of low molecular weight with a propylene polymer of high molecular weight, and it may cause the formation of gels and the deterioration of impact strength in thus obtained polymers as another problem.

The inventors of the present invention proposed a method of preparing propylene polymers having a wide molecular weight distribution by using as a catalyst a specific organosilicon compound containing polycyclic amino group in EP-A-841348 (JP-A-10-218926). In this method, though hydrogen is needed to coexist with a polymerization system as a chain transfer agent in order to adjust molecular weight of α-olefin polymers, the polymerization system has a low hydrogen sensibility. Therefore, it is necessary to use a great amount of hydrogen in order to prepare α-olefin polymers having a low molecular weight.

Where a great amount of hydrogen is introduced into a polymerization vessel, a pressure in the polymerization vessel becomes high. Since the polymerization vessel has a limitative pressure resistance, the polymerization temperature should be lowered, thus causing adverse effects to the production speed.

Further, it may be strongly demanded that α-olefin polymer products obtained by an injection molding has less appearance defects (e.g., flow mark). However, the demand has not been met depending on the conditions.

SUMMARY OF THE INVENTION

It is an object of the present invention to provide a method of preparing an α-olefin polymer having high stereoregularity and wide molecular distribution, using a high active and high hydrogen sensible catalyst system.

It is another object of the present invention to provide a method of preparing an α-olefin polymer, an injection molding product of which has less appearance defects (e.g., flow mark).

The first aspect of the present invention relates to a method for preparing an α-olefin polymer comprising the step of polymerizing or copolymerizing an α-olefin in the presence of a catalyst which contains a solid catalyst constituent (A) which contains magnesium, titanium, a halogen element and an electron donor, an organoaluminum compound constituent (B), an organosilicon compound constituent (C) represented by the following general formula (4) and an organosilicon compound constituent (D) represented by the following general formulas (5) or (6) to prepare an α-olefin polymer $$R_nSi(OR)_{4-n} \quad (4)$$

(wherein R is a hydrocarbon group having 1 to 8 carbon atoms, n is integer of 1 or 2)

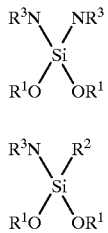

(5)

(6)

(wherein $R^1$ is a hydrocarbon group having 1 to 8 carbon atoms, $R^2$ is a hydrocarbon group having 1 to 8 carbon atoms, a hydrocarbylamino group having 2 to 24 carbon atoms, or a hydrocarbylalkoxy group having 1 to 24 carbon atoms, $R^3N$ is a polycyclic amino group having 7 to 40 carbon atoms, wherein the carbon atoms and the nitrogen atom form a cyclic skeleton).

In the said method, a mixture of the constituent (C) and the constituent (D) can be employed as an organosilicon compound used either in the prepolymerization or in the main polymerization, or both in the prepolymerization and in the main polymerization. Further, a mixture of the constituent (C) and the constituent (D) can be employed as an organosilicon compound used in the main polymerization after the prepolymerization with the constituent (C). Also, a mixture of the constituent (C) and the constituent (D) can be employed as an organosilicon compound used in the prepolymerization followed by the main polymerization with the constituent (D).

In the said method, it is preferred that said polymerizing or copolymerizing an α-olefin comprises the steps of prepolymerizing an α-olefin in the presence of a catalyst containing said solid catalyst constituent (A), said organoaluminum compound constituent (B), and said organosilicon compound constituent (C); and main polymerizing or copolymerizing an α-olefin by adding said organosilicon compound constituent (D) to prepare an α-olefin polymer.

In the said method, it is preferred that an amount of the organosilicon compound constituent (C) in the polymerization is 0.1 to 10 in terms of atomic ratio (Si/Ti) of silicon atom of the constituent (C) to titanium atom of the constituent (A), and 0.01 to 2 in terms of atomic ratio (Si/Al) of silicon atom of the constituent (C) to aluminum atom of the constituent (B).

In the said method, it is preferred that the organosilicon compound constituents (C) and (D) are selected to satisfy the following formula:

$$1.3 \leq \log[MFR(C)/MFR(D)] \leq 4.0$$

preferably the following formula:

$$1.4 \leq \log[MFR(C)/MFR(D)] \leq 4.0,$$

more preferably the following formula:

$$1.6 \leq \log[MFR(C)/MFR(D)] \leq 4.0.$$

(wherein MFR(C) is a melt flow rate of polypropylene homopolymer obtained by polymerizing propylene in the presence of the constituents (A), (B), and (C), and MFR(D) is a melt flow rate of polypropylene homopolymer obtained by polymerizing propylene in the presence of the constituent (D) in stead of the constituent (C) in the same polymerizing condition as that conducted in the presence of the constituents (A), (B), and (C)), In the said method, it is preferred that the organosilicon compound constituents (C) and (D) are selected to satisfy the following formulas $$0.96 < [mmmm(D)/mmmm(C)] \leq 1.1 \text{ and } 96\% \leq mmmm(D)$$

(wherein mmmm(C) is an isopentad fraction of polypropylene homopolymer obtained by polymerizing propylene in the presence of the constituents (A), (B), and (C), and mmmm(D) is isopentad fraction of polypropylene homopolymer obtained by polymerizing propylene in the presence of the constituent (D) in stead of the constituent (C) in the same polymerizing condition as that conducted in the presence of the constituents (A), (B), and (C)).

The second aspect of the present invention relates to an α-olefin polymer prepared by the above-mentioned method.

The third aspect of the present invention relates to an α-olefin polymer prepared by polymerizing an α-olefin in the presence of a catalyst containing a solid catalyst constituent (A) which contains magnesium, titanium, a halogen element and an electron donor, an organoaluminum compound constituent (B), an organosilicon compound constituent (C) represented by the above-mentioned general formula (4); and an organosilicon compound constituent (D) represented by the above-mentioned general formulas (5) or (6), wherein a molecular weight distribution in terms of a Mw/Mn ratio is 8 to 20 and a Mz/Mw ratio is 5 to 10 (wherein The Mw/Mn ratio is obtained by calculating from the weight average molecular weight Mw and the number average molecular weight Mn, and the Mz/Mw ratio is obtained by calculating from the Z average molecular weight Mz and the weight average molecular weight Mw, which are measured by means of GPC (gel permeation chromatography) and obtained as the converted values of polystyrene.).

The forth aspect of the present invention relates to an injection molding product having an α-olefin polymer prepared by polymerizing an α-olefin in the presence of a catalyst containing a solid catalyst constituent (A) which contains magnesium, titanium, a halogen element and an electron donor, an organoaluminum compound constituent (B), an organosilicon compound constituent (C) represented by the above-mentioned general formula (4); and an organosilicon compound constituent (D) represented by the above-mentioned general formulas (5) or (6)

BRIEF DESCRIPTION OF THE VIEWS OF DRAWINGS

Figure 2:
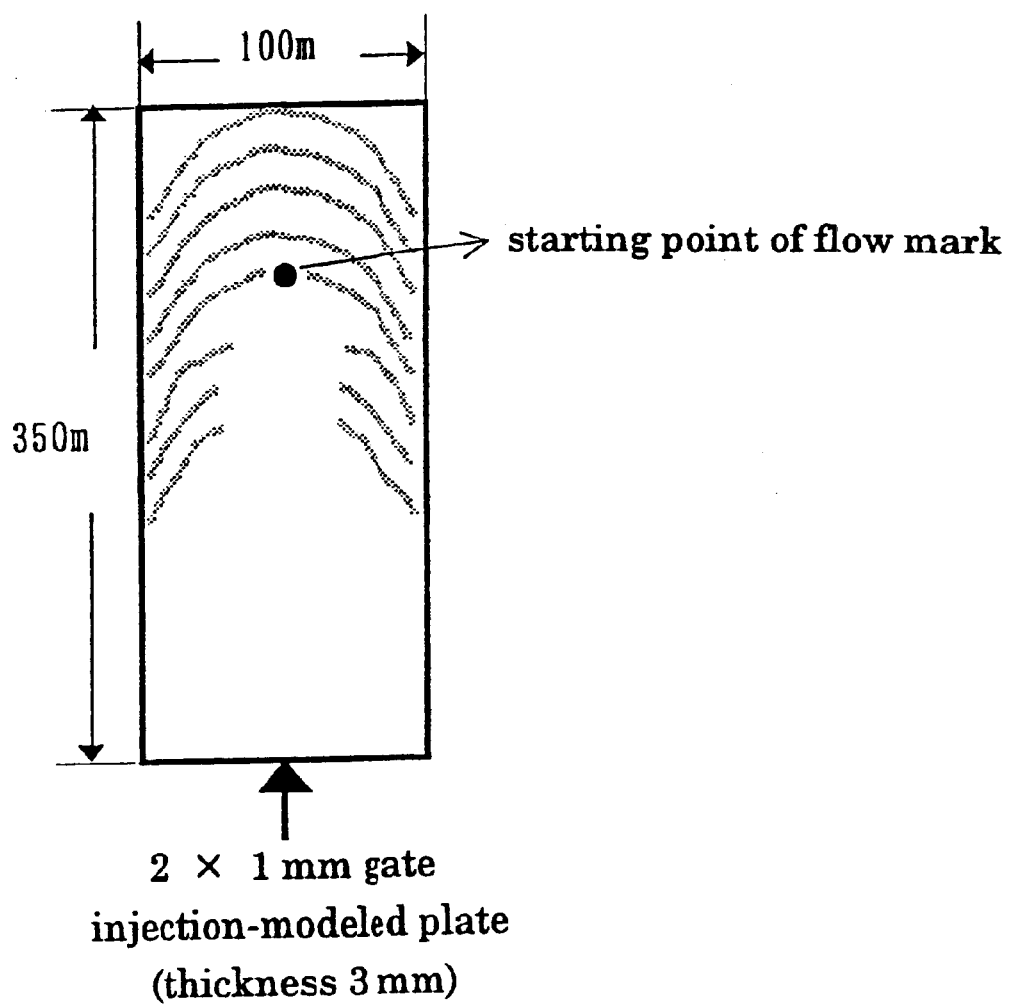

FIG. 1 is a flow chart showing a preparation process of the catalyst and a polymerization method according to the present invention; and FIG. 2 is a model view showing a flow mark of a injection-molded article of the α-olefin polymer obtained by the present invention.

DETAILED DESCRIPTION OF THE INVENTION

In the present invention, a solid constituent of the catalyst, containing magnesium, titanium, a halogen element and an electron donor indispensably, is used as the constituent (A). Since there is no particular restriction as to the process for preparation of the solid constituent of the catalyst, it can be prepared by using methods for example those proposed in JP-A-54-94590, JP-A-56-55405, JP-A-56-45909, JP-A-56-163102, JP-A-57-63310, JP-A-57-115408, JP-A-58-83006, JP-A-58-83016, JP-A-58-138707, JP-A-59-149905, JP-A-60-23404, JP-A-60-32805, JP-A-61-18300, JP-A-61-55104, JP-A-2-77413, JP-A-2-117905 and others.

As to the representative method for preparing the constituent (A), there can be exemplified (i) a method which comprises co-grinding a magnesium compound (e.g., magnesium chloride), an electron donor and a titanium halide compound (e.g., titanium tetrachloride), or (ii) a method which comprises dissolving a magnesium compound and an electron donor in a solvent and adding a titanium halide compound to the resulting solution to precipitate a solid catalyst.

In order to achieve the object of the present invention, those solid catalysts disclosed in JP-A-60-152511, JP-A-61-31402 and JP-A-62-81405 are particulary preferable as to constituent (A). According to methods as disclosed in those prior art literatures, an aluminum halide compound is reacted with a silicon compound, then the reaction product is further reacted with a Grignard compound so as to precipitate a solid substance. The aluminum compound usable in the above reaction is preferably an anhydrous aluminum halide. However, the use of a completely anhydrous aluminum halide is virtually difficult due to the hygroscopicity thereof, and it may be possible to use an aluminum halide containing a small amount of water. Specific examples of the aluminum halide include aluminum trichloride, aluminum tribromide, aluminum triiodide. Particularly, aluminum trichloride is preferred.

Specific examples of the silicon compounds usable in the above reaction include tetramethoxysilane, tetraethoxysilane, tetrabutoxysilane, methyltriethoxysilane, ethyltributoxysilane, phenyltriethoxysilane, phenyltributoxysilane, dimethyldiethoxysilane, diphenyldimethoxysilane, methylphenyldimethoxysilane, diphenyldiethoxysilane, trimethylmonoethoxysilane and trimethylmonobutoxysilane. Particularly, methylphenyldimethoxysilane, tetraethoxysilane, methyltriethoxysilane, phenyltrimethoxysilane and dimethyldiethoxysilane are preferred.

In the reaction of the aluminum halide with the silicon compound, the ratio of used amount of these compounds is generally 0.4 to 1.5, preferably 0.7 to 1.3 in terms of atomic ratio (Al/Si). In the reaction, it is preferable to use an inert solvent such as hexane, toluene or the like. The reaction temperature is generally 10 to 100° C., preferably 20 to 80° C., and the reaction time is generally 0.2 to 5 hours, preferably 0.5 to 3 hours.

Specific examples of the magnesium compounds usable in the above reaction include ethylmagnesium chloride, propylmagnesium chloride, butylmagnesium chloride, hexylmagnesium chloride, octylmagnesium chloride, ethylmagnesium bromide, propylmagnesium bromide, butylmagnesium bromide and ethylmagnesium iodide. As to the solvent for the magnesium compound, there can be used, for example, aliphatic ethers such as diethyl ether, dibutyl ether, diisopropyl ether, diisoamyl ether and the like; aliphatic cyclic ethers such as tetrahydrofuran and the like.

The used amount of a magnesium compound is generally in the range of 0.5 to 3, preferably 1.5 to 2.3 in terms of atomic ratio (Mg/Al) of a magnesium compound to an aluminum halide which are used for preparation of the reaction product of an aluminum halide with a silicon compound. The reaction temperature is generally from −50° C. to 100° C., preferably −20° C. to 50° C., and the reaction time is generally in the range of 0.2 to 5 hours, preferably 0.5 to 3 hours.

A white solid substance obtained by the reaction of an aluminum halide with a silicon compound and subsequent reaction with a Grignard compound is subjected to contact treatment with an electron donor and a titanium halide compound. The contact treatment can be conducted by conventional methods which are well-known in the art, for example, (i) a method which comprises treating the solid substance with a titanium halide compound, then with an electron donor, and again treating with the titanium halide compound; or (ii) a method which comprises treating the solid substance with a titanium halide compound in the coexistence of an electron donor, and again treating with the titanium halide compound.

The contact treatment is conducted for example, by dispersing the above-mentioned solid substance in an inert solvent and adding an electron donor and/or a titanium halide compound thereto to dissolve the electron donor and/or the titanium halide compound therein, or by dispersing the solid substance in an electron donor and/or a liquid state titanium halide compound without by using an inert solvent. In this case, the contact treatment of the solid substance with the electron donor and/or the titanium halide compound can be conducted under stirring, generally at a temperature of 50 to 150° C., for 0.2 to 5 hours, though the contact time is not particularly restricted. The contact treatment may be repeated in several times.

Specific examples of the titanium halide compounds usable in the contact treatment include tetrachlorotitanium, tetrabromotitanium, trichloromonobutoxytitanium, tribromomonoethoxytitanium, trichloromonoisopropoxytitanium, dichlorodiethoxytitanium, dichlorodibutoxytitanium, monochlorotriethoxytitanium, and monochlorotributoxytitanium. Particularly, tetrachlorotitanium and trichloromonobutoxytitanium are preferred.

As an electron donor, used is a compound of Lewis base, preferably aromatic diester, and particularly a diester of orthophthalic acid is preferred. Specific examples of the diesters of orthophthalic acid include diethyl orthophthalate, di-n-butyl orthophthalate, diisobutyl orthophthalate, dipentyl orthophthalate, di-n-hexyl orthophthalate, di-2- ethylhexyl orthophthalate, di-n-heptyl orthophthalate, di-n-octyl orthophthalate, and the like.

Further, as an electron donor, used may be a compound having two or more ether groups, such as those disclosed in JP-A-3-706, JP-A-3-62805, JP-A-4-270705, and JP-A-6-25332. Preferable examples of these compounds include 2-isopropyl-2-isobutyl-1,3-dimethoxypropane, 2-isopropyl-2-isopentyl-1,3-dimethoxypropane, 2,2-diisobutyl-1,3-dimethoxypropane, and the like.

After the contact treatment, the resulting solid substance is generally separated from treatment mixture and thoroughly washed with an inert solvent, and then, thus obtained solid substance can be used as the catalyst solid constituent (A) used in the present invention for polymerization of α-olefin.

Organoaluminum compounds as to the constituent (B) used in the present invention can be alkylaluminum, alkylaluminum halide, and the like. Among those compounds, an alkylaluminum is preferred, and a trialkylaluminum is particularly preferred. Specific examples of the trialkylaluminum include trimethylaluminum, triethylaluminum, tri-n-propylaluminum, triisobutylaluminum, trihexylaluminum and trioctylaluminum. These organoaluminum compounds can be used in admixture thereof. Also, polyaluminoxane obtained by the reaction of alkylaluminum and water can be used as well.

The amount of an organoaluminum compound as to the constituent (B) of the catalyst for polymerization of an α-olefin is 0.1 to 500, preferably 0.5 to 150 in terms of atomic ratio (Al/Ti) of aluminum atom of the organoaluminum compound to titanium atom in the solid constituent (A) of the catalyst.

Constituent (C) used in the present invention is an organosilicon compound having a hydrocarbon group and represented by the general formula (4). In formula (4), R represents a hydrocarbon group having 1 to 8 carbon atoms including an unsaturated or saturated aliphatic hydrocarbon group, and n denotes an integer of 1 or 2. A preferable n value is 2. In formula (4), all R may be same or different. Specific examples of R include methyl group, ethyl group, n-propyl group, iso-propyl group, n-butyl group, iso-butyl group, ter-butyl group, sec-butyl group, n-pentyl group, iso-pentyl group, cyclopentyl group, n-hexyl group and cyclohexyl group. Particularly, n-butyl group is preferred.

Specific examples of the organosilicon compounds include di(methyl)dimethoxysilane, ethyl(methyl)dimethoxysilane, di(ethyl)dimethoxysilane, methyl(n-propyl)dimethoxysilane, ethyl(n-propyl)dimethoxysilane, di(n-propyl)dimethoxysilane, methyl(iso-propyl)dimethoxysilane, ethyl(iso-propyl)dimethoxysilane, n-propyl(iso-propyl)dimethoxysilane, di(iso-propyl)dimethoxysilane, n-butyl(methyl)dimethoxysilane, n-butyl(ethyl)dimethoxysilane, n-butyl(n-propyl)dimethoxysilane, iso-propyl(n-butyl)dimethoxysilane, di(n-butyl)dimethoxysilane, iso-butyl(methyl)dimethoxysilane, iso-butyl(ethyl)dimethoxysilane, n-propyl(iso-butyl)dimethoxysilane, iso-propyl(iso-butyl)dimethoxysilane, n-butyl(iso-butyl)dimethoxysilane, di(iso-butyl)dimethoxysilane, ter-butyl(methyl)dimethoxysilane, ethyl(ter-butyl)dimethoxysilane, ter-butyl(n-propyl)dimethoxysilane, iso-propyl(ter-butyl)dimethoxysilane, n-butyl(ter-butyl)dimethoxysilane, iso-butyl(ter-butyl)dimethoxysilane, sec-butyl(methyl)dimethoxysilane, sec-butyl(ethyl)dimethoxysilane, sec-butyl(n-propyl)dimethoxysilane, iso-propyl(sec-butyl)dimethoxysilane, n-butyl(sec-butyl)dimethoxysilane, iso-butyl(sec-butyl)dimethoxysilane, ter-butyl(sec-butyl)dimethoxysilane, di(sec-butyl)dimethoxysilane, methyl(n-pentyl)dimethoxysilane, ethyl(n-pentyl)dimethoxysilane, n-propyl(n-pentyl)dimethoxysilane, iso-propyl(n-pentyl)dimethoxysilane, n-butyl(n-pentyl)dimethoxysilane, iso-butyl(n-pentyl)dimethoxysilane, ter-butyl(n-pentyl)dimethoxysilane, sec-butyl(n-pentyl)dimethoxysilane, di(n-pentyl)dimethoxysilane, methyl(iso-pentyl)dimethoxysilane, ethyl(iso-pentyl)dimethoxysilane, n-propyl(iso-pentyl)dimethoxysilane, n-butyl(iso-pentyl)dimethoxysilane, n-pentyl(iso-pentyl)dimethoxysilane, di(iso-pentyl)dimethoxysilane, methyl(n-hexyl)dimethoxysilane, ethyl(n-hexyl)dimethoxysilane, n-propyl(n-hexyl)dimethoxysilane, n-butyl(n-hexyl)dimethoxsilane, n-pentyl(n-hexyl)dimethoxysilane, di(n-hexyl)dimethoxysilane, cyclohexyl(methyl)dimethoxysilane, cyclohexyl(ethyl)dimethoxysilane, cyclohexyl(n-propyl)dimethoxysilane, cyclohexyl(n-butyl)dimethoxysilane, cyclohexyl(n-pentyl)dimethoxysilane, cyclohexyl(n-hexyl)dimethoxysilane, di(cyclohexyl)dimethoxysilane, and di(n-butyl)dimethoxysilane. Particularly n-butyl(methyl)dimethoxysilane and di(n-butyl)dimethoxysilane are preferred.

The amount of the organosilicon compound as the constituent (C) in the prepolymerization is 0.1 to 10, preferably 0.2 to 2 in terms of atomic ratio (Si/Ti) of silicon atom of the organosilicon compound to titanium atom of the constituent (A). Further, the amount of the organosilicon compound as the constituent (C) in the prepolymerization is 0.01 to 2, preferably 0.1 to 1 in terms of atomic ratio (Si/Al) of silicon atom of the organosilicon compound to aluminum atom of the constituent (B).

Prepolymerization is conducted by mixing and reacting the constituents (B), (C) and (A) generally at a temperature of 0 to 70° C., preferably 10 to 40° C., for 0.01 to 10 hours, preferably 0.1 to 1 hour. Though the order of mixing of the individual constituents is not particularly restricted, the order of the constituent (A), the constituent (B) and the constituent (C) is generally preferred.

After prepolymerization, the resulting solid may be subjected to a main polymerization without being washed and filtered. Alternatively, the resulting solid may be filtered and washed with an inert hydrocarbon solvent such as n-heptane before being subjected to a main polymerization.

The effects of the prepolymerization are the improvements of polymerization activity, stereoregularity of the polymer and stabilization of particle shapes (morphology) of the polymer. A restricted amount of ethylene or α-olefin is polymerized by using the above-mentioned solid catalyst constituent (A), in the presence of the constituent (B) or (C) to prepare the prepolymerized solid. The amount of the polymer prepared by prepolymerization is 0.1 to 1000, preferably 1 to 100 in terms of weight ratio to the amount of the constituent (A). Depending on the circumstances, a pre-treated solid may be prepared without using α-olefin with the same results as in the case using the prepolymerized solid.

The prepolymerization in the present invention can be conducted by gas-phase polymerization, slurry polymerization and bulk polymerization. The solid obtained in the prepolymerization can be used in the main polymerization after being separated or without being separated.

Constituent (D) used in the present invention is an organosilicon compound represented by the above-mentioned general formula (5) or (6). In formula (5) or (6), $R^1$ represents a hydrocarbon group having 1 to 8 carbon atoms including an unsaturated or saturated aliphatic hydrocarbon group having 1 to 8 carbon atoms. Specific examples of $R^1$ include methyl group, ethyl group, n-propyl group, iso-propyl group, n-butyl group, iso-butyl group, ter-butyl group, sec-butyl group, n-pentyl group, iso-pentyl group, cyclopentyl group, n-hexyl group and cyclohexyl group. Among these, methyl group is particularly preferred.

In formula (5) or (6), $R^2$ represents a hydrocarbon group having 2 to 24 carbon atoms, preferably 2 to 8 carbon atoms, a hydrocarbylamino group having 2 to 24 carbon atoms, preferably 2 to 8 carbon atoms, or a hydrocarbylalkoxy group having 2 to 24 carbon atoms, preferably 2 to 8 carbon atoms . Among these, a hydrocarbon group having 2 to 24 carbon atoms or a hydrocarbylamino group having 2 to 24 carbon atoms is preferred.

Specific examples of the hydrocarbon group having 2 to 24 carbon atoms include ethyl group, n-propyl group, iso-propyl group, n-butyl group, iso-butyl group, sec-butyl group, ter-butyl group, n-pentyl group, iso-pentyl group, n-hexyl group, n-heptyl group, n-octyl group, cyclopentyl group, cyclohexyl group, texyl group, phenyl group benzyl group, tolyl group and the like. The other example is a hydrocarbon group containing silicon atom such as trimethylsilylmethyl group and bis trimethylsilylmethyl group.

Specific examples of the hydrocarbylamino group having 2 to 24 carbon atoms include, dimethylamino group, methylethylamino group, diethylamino group, ethyl-n-propyl-amino group, di-n-propyl-amino group, ethylisopropyl-amino group, diisopropyl-amino group, pyrrolidino group, piperidino group, and hexamethyleneimino group.

Specific examples of the hydrocarbylalkoxy group having 2 to 24 carbon atoms include methoxy group, iso-propoxy group, and ter-butoxy group.

Among them, propyl group such as n-propyl group and isopropyl group, butyl group such as iso-butyl group and ter-butyl group, cyclopentyl group, diethylamino group, ter-butoxy group, and the like are preferably used.

$R^3N$ represents a polycyclic amino group having 7 to 40 carbon atoms, wherein the carbon atoms and the nitrogen atom form a cyclic skeleton. The polycyclic amino group may be a saturated polycyclic amino group, or may be a partially or entirely unsaturated polycyclic amino group. The nitrogen atom of the polycyclic amino group is bonded directly to the silicon atom of the organosilicon compound to form Si—N bond. Thus, the polycyclic amino group can be defined as a substituent formed by chemically bonding the N atom to Si atom by removing the hydrogen atom from the secondary amine $R^3NH$. In the general formula (5), each one of two $R^3N$ groups may be the same or different.

Specific examples of the polycyclic amino group include amine compounds as mentioned by the following chemical structural formulas (7); perhydroindole, perhydroisoindole, perhydroquinoline, perhydroisoquinoline, perhydrocarbazole, perhydroacrydine, perhydrophenanthoridine, perhydrobenzo(g)quinoline, perhydrobenzo(h)quinoline, perhydrobenzo(f)quinoline, perhydrobenzo(g)isoquinoline, perhydrobenzo(h)isoquinoline, perhydrobenzo(f)isoquinoline, perhydroacequinoline, perhydroaceisoquinoline, perhydroiminostilbene, and amine compounds in which some of the hydrogen atoms other than the nitrogen atom are substituted with alkyl group, phenyl group or cycloalkyl group.

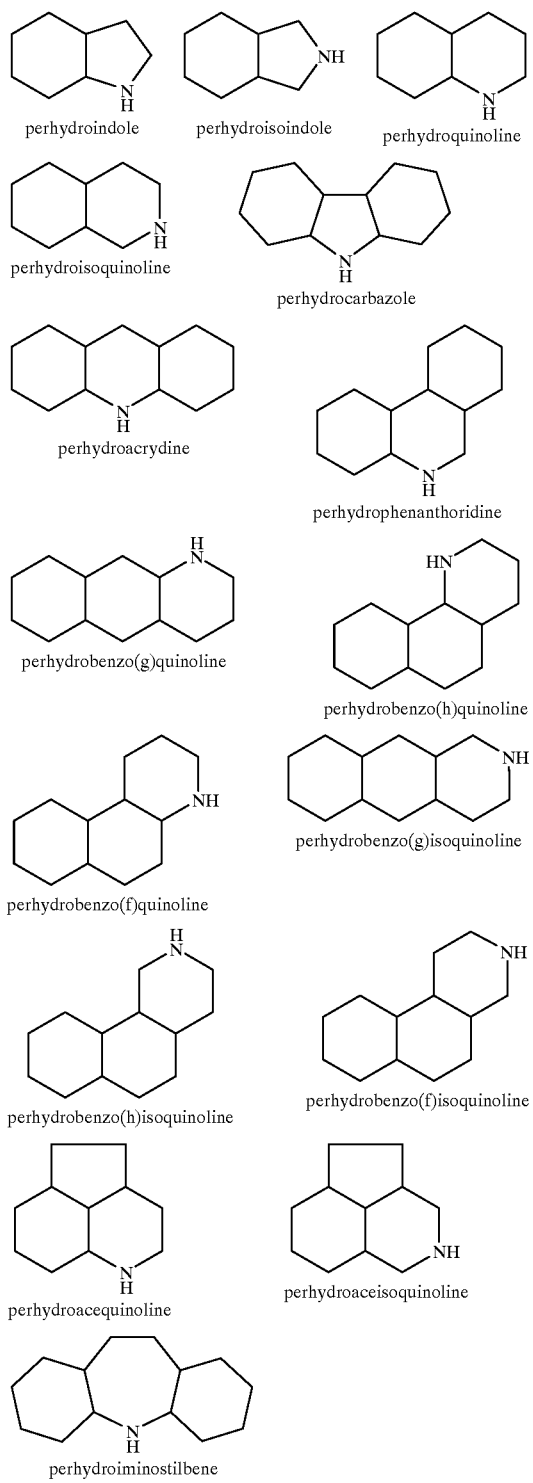

Further, $R^3NH$ represents amine compounds such as 1,2,3,4-tetrahydroquinoline and 1,2,3,4-tetrahydroisoquinoline as mentioned by the following chemical structural formulas (8), which is a partially unsaturated polycyclic amino compound, or in which some of the hydrogen atoms other than the nitrogen atom are substituted with alkyl group, phenyl group or cycloalkyl group.

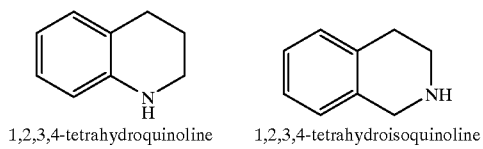

1,2,3,4-tetrahydroquinoline     1,2,3,4-tetrahydroisoquinoline

Specifically preferable examples of the amine compounds represented by R³NH include perhydroquinoline, perhydroisoquinoline, 1,2,3,4-tetrahydroquinoline, 1,2,3,4-tetrahydroisoquinoline, and their derivatives.

As to the organosilicon compounds represented by the formula (5), there can be exemplified a bisperhydroquinolino compound represented by the formula (9), a bisperhydroisoquinolino compound represented by the formula (10), a (perhydroquinolino) perhydroisoquinolino compound represented by the formula (11), bis(1,2,3,4-tetrahydroquinolino) compound represented by the formula (12), a bis(1,2,3,4-tetrahydroisoquinolino) compound represented by the formula (13), a (1,2,3,4-tetrahydroquinolino) (1,2,3,4-tetrahydroisoquinolino) compound represented by the formula (14).

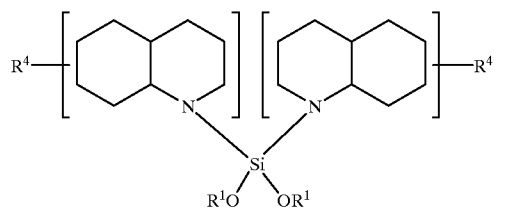

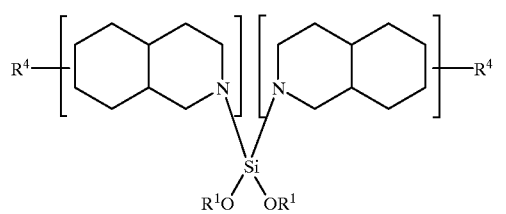

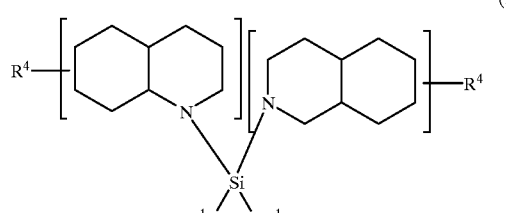

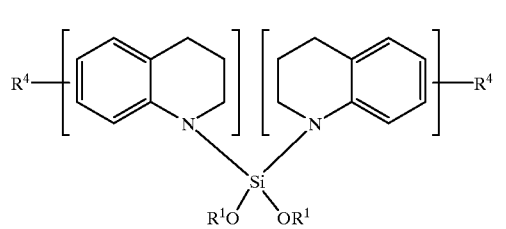

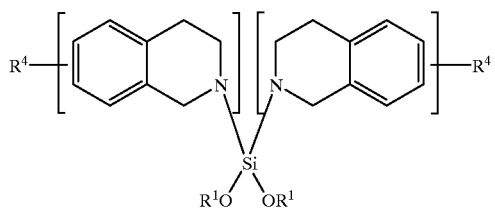

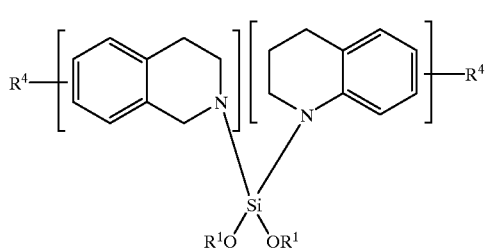

In the above formulas, $R^4$ represents a substituted group on the saturated cyclic skeleton of the general formula $R^3N$ and is hydrogen atom, or a saturated or unsaturated aliphatic hydrocarbon group having 1 to 24 carbon atoms. The preferable examples of $R^4$ includes hydrogen atom, methyl group, ethyl group, n-propyl group, iso-propyl group, n-butyl group, iso-butyl group, ter-butyl group, sec-butyl group, and the like. The number of hydrocarbon groups substituted on the saturated cyclic structure of $R^3N$ may be 1 or more.

As to the compound represented by the formula 9, bis(perhydroquinolino)dimethoxysilane is exemplified.

Specific examples of the bis(methyl-substituted-perhydroquinolino)dimethoxysilane compounds include,
bis(2-methylperhydroquinolino)dimethoxysilane,
bis(3-methylperhydroquinolino)dimethoxysilane,
bis(4-methylperhydroquinolino)dimethoxysilane,
bis(5-methylperhydroquinolino)dimethoxysilane,
bis(6-methylperhydroquinolino)dimethoxysilane,
bis(7-methylperhydroquinolino)dimethoxysilane,
bis(8-methylperhydroquinolino)dimethoxysilane,
bis(9-methylperhydroquinolino)dimethoxysilane,
bis(10-methylperhydroquinolino)dimethoxysilane and the like.

Specific examples of bis(dimethyl-substituted-perhydroquinolino)dimethoxysilane compounds include,
bis(2,3-dimethylperhydroquinolino)dimethoxysilane,
bis(2,4-dimethylperhydroquinolino)dimethoxysilane,
bis(2,5-dimethylperhydroquinolino)dimethoxysilane,
bis(2,6-dimethylperhydroquinolino)dimethoxysilane,
bis(2,7-dimethylperhydroquinolino)dimethoxysilane,
bis(2,8-dimethylperhydroquinolino)dimethoxysilane,
bis(2,9-dimethylperhydroquinorino)dimethoxysilane,
bis(2,10-dimethylperhydroquinolino)dimethoxysilane,
bis(3,4-dimethylperhydroquinolino)dimethoxysilane,
bis(3,5-dimethylperhydroquinolino)dimethoxysilane,
bis(3,6-dimethylperhydroquinolino)dimethoxysilane,
bis(3,7-dimethylperhydroquinolino)dimethoxysilane,
bis(3,8-dimethylperhydroquinolino)dimethoxysilane, bis(3,9-dimethylperhydroquinolino)dimethoxysilane,
bis(3,10-dimethylperhydroquinolino)dimethoxysilane,
bis(4,5-dimethylperhydroquinolino)dimethoxysilane,
bis(4,6-dimethylperhydroquinolino)dimethoxysilane,
bis(4,7-dimethylperhydroquinolino)dimethoxysilane,
bis(4,8-dimethylperhydroquinolino)dimethoxysilane,
bis(4,9-dimethylperhydroquinolino)dimethoxysilane,
bis(4,10-dimethylperhydroquinolino)dimethbxysilane,
bis(5,6-dimethylperhydroquinolino)dimethoxysilane,
bis(5,7-dimethylperhydroquinolino)dimethoxysilane,
bis(5,8-dimethylperhydroquinolino)dimethoxysilane,
bis(5,9-dimethylperhydroquinolino)dimethoxysilane,
bis(5,10-dimethylperhydroquinolino)dimethoxysilane,
bis(6,7-dimethylperhydroquinolino)dimethoxysilane,
bis(6,8-dimethylperhydroquinolino)dimethoxysilane,
bis(6,9-dimethylperhydroquinolino)dimethoxysilane,
bis(6,10-dimethylperhydroquinolino)dimethoxysilane,
bis(7,8-dimethylperhydroquinolino)dimethoxysilane,
bis(7,9-dimethylperhydroquinolino)dimethoxysilane,
bis(7,10-dimethylperhydroquinolino)dimethoxysilane,
bis(8,9-dimethylperhydroquinolino)dimethoxysilane,
bis(9,10-dimethylperhydroquinolino)dimethoxysilane and the like.

Specific examples of bis(trimethyl-substituted-perhydroquinolino)dimethoxysilane compounds include, bis(2,3,4-trimethylperhydroquinolino)dimethoxysilane,
bis(3,4,5-trimethylperhydroquinolino)dimethoxysilane,
bis(4,5,6-trimethylperhydroquinolno)dimethoxysilane,
bis(5,6,7-dimethylperhydroquinolino)dimethoxysilane,
bis(6,7,8-trimethylperhydroquinolino)dimethoxysilane,
bis(7,8,9-trimethylperhydroquinolino)dimethoxysilane,
bis(8,9,10-trimethylperhydroquinolino)dimethoxysilane and the like.

Further, there can be exemplified compounds of
(perhydroquinolino)(2-methylperhydroquinolino)dimethoxysilane,
(perhydroquinolino)(3-methylperhydroquinolino)dimethoxysilane,
(perhydroquinolino)(4-methylperhydroquinolino)dimethoxylsilane,
(perhydroquinolino)(5-methylperhydroquinolino)dimethoxysilane,
(perhydroquinolino)(6-methylperhydroquinolino)dimethoxysilane,
(perhydroquinolino)(7-methylperhydroquinolino)dimethoxysilane,
(perhydroquinolino)(8-methylperhydroquinolino)dimethoxysilane,
(perhydroquinolino)(9-methylperhydroquinolino)dimethoxysilane,
(perhydroquinolino)(10-methylperhydroquinolino)dimethoxysilane and the like.

Among these compounds, bis(perhydroquinolino)dimethoxysilane is preferred.

Examples of the compound represented by the general formula (10), there can be mentioned bis(perhydroisoquinolino)dimethoxysilane and the like.

Examples of the compounds of bis(methyl-substituted-perhydroisoquinolino)dimethoxysilanes include,
bis(1-methylperhydroisoquinolino)dimethoxysilane,
bis(3-methylperhydroisoquinolino)dimethoxysilane,
bis(4-methylperhydroisoquinolino)dimethoxysilane,
bis(5-methylperhydroisoquinolino)dimethoxysilane,
bis(6-methylperhydroisoquinolino)dimethoxysilane,
bis(7-methylperhydroisoquinolino)dimethoxysilane,
bis(8-methylperhydroisoquinolino)dimethoxysilane,
bis(9-methylperhydroisoquinolino)dimethoxysilane,
bis(10-methylperhydroisoquinolino)dimethoxysilane and the like.

Examples of the compounds of bis(dimethyl-substituted-perhydroisoquinolino)dimethoxysilane include,
bis(1,3-dimethylperhydroisoquinolino)dimethoxysilane,
bis(1,4-dimethylperhydroisoquinolino)dimethoxysilane,
bis(1,5-dimethylperhydroisoquinolino)dimethoxysilane,
bis(1,6-dimethylperhydroisoquinolino)dimethoxysilane,
bis(1,7-dimethylperhydroisoquinolino)dimethoxysilane,
bis(1,8-dimethylperhydroisoquinolino)dimethoxysilane,
bis(1,9-dimethylperhydroisoquinolino)dimethoxysilane,
bis(1,10-dimethylperhydroisoquinolino)dimethoxysilane,
bis(3,4-dimethylperhydroisoquinolino)dimethoxysilane,
bis(3,5-dimethylperhydroisoquinolino)dimethoxysilane,
bis(3,6-dimethylperhydroisoquinolino)dimethoxysilane,
bis(3,7-dimethylperhydroisoquinolino)dimethoxysilane,
bis(3,8-dimethylperhydroisoquinolino)dimethoxysilane,
bis(3,9-dimethylperhydroisoquinolino)dimethoxysilane,
bis(3,10-dimethylperhydroisoquinolino)dimethoxysilane,
bis(4,5-dimethylperhydroisoquinolino)dimethoxysilane,
bis(4,6-dimethylperhydroisoquinolino)dimethoxysilane,
bis(4,7-dimethylperhydroisoquinolino)dimethoxysilane,
bis(4,8-dimethylperhydroisoquinolino)dimethoxysilane,
bis(4,9-dimethylperhydroisoquinolino)dimethoxysilane,
bis(4,10-dimethylperhydroisoquinolino)dimethoxysilane,
bis(5,6-dimethylperhydroisoquinolino)dimethoxysilane,
bis(5,7-dimethylperhydroisoquinolino)dimethoxysilane,
bis(5,8-dimethylperhydroisoquinolino)dimethoxysilane,
bis(5,9-dimethylperhydroisoquinolino)dimethoxysilane,
bis(5,10-dimethytperhydroisoquinolino)dimethoxysilane,
bis(6,7-dimethylperhydroisoquinotino)dimethoxysilane,
bis(6,8-dimethylperhydroisoquinolino)dimethoxysilane,
bis(6,9-dimethylperhydroisoquinolino)dimethoxysilane,
bis(6,10-dimethylperhydroisoquinolino)dimethoxysilane,
bis(7,8-dimethylperhydroisoquinolino)dimethoxysilane,
bis(7,9-dimethylperhydroisoquinolino)dimethoxysilane,
bis(7,10-dimethylperhydroisoquinolino)dimethoxysilane,
bis(8,9-dimethylperhydroisoquinolino)dimethoxysilane,
bis(8,10-dimethylperhydroisoquinolino)dimethoxysilane,
bis(9,10-dimethylperhydroisoquinolino)dimethoxysilane and the like.

Examples of the compounds of bis(trimethyl-substituted-perhydroisoquinolino)dimethoxysilane include,
bis(1,3,4-trimethylperhydroisoquinolino)dimethoxysilane,
bis(3,4,5-trimethylperhydroisoquinolino)dimethoxysilane,
bis(4,5,6-trimethylperhydroisoquinolino)dimethoxysilane,
bis(5,6,7-trimethylperhydroisoquinolino)dimethoxysilane, bis(6,7,8-trimethylperhydroisoquinolino)
dimethoxysilane,
bis(7,8,9-trimethylperhydroisoquinolino)
dimethoxysilane,
bis(8,9,10-trimethylperhydroisoquinolino)
dimethoxysilane and the like.

Further, examples of the compounds of (perhydroisoquinolino)(monomethyl-substituted perhydroisoquinolino)-dimethoxysilane include, (perhydroisoquinolino)(2-methyl-perhydroisoquinolino)
dimethoxysilane,
(perhydroisoquinolino)(3-methylperhydroisoquinolino)
dimethoxysilane,
(perhydroisoquinolino)(4-methylperhydroisoquinolino)
dimethoxysilane,
(perhydroisoquinolino)(5-methylperhydroisoquinolino)
dimethoxysilane,
(perhydroisoquinolino)(6-methylperhydroisoquinolino)
dimethoxysilane,
(perhydroisoquinolino)(7-methylperhydroisoquinolino)
dimethoxysilane,
(perhydr-oisoquinolino)(8-methylperhydrosoquinolino)
dimethoxysilane,
(perhydroisoquinolino)(9-methylperhydroisoquinolino)
dimethoxysilane,
(perhydroisoquinolino)(10-methylperhydroisoquinolitno)
dimethoxysilane and the like.

Among these compounds, bis(perhydroisoquinolino) dimethoxysilane is preferable.

Examples of the compounds represented by the general formula. (11) include, (perhydroquinolino)(perhydroisoquinolino)
dimethoxysilane,
(perhydroquinolino)(1-methylperhydroisoquinolino)
dimethoxysilane,
(perhydroquinolino)(3-methylperhydroisoquinolino)
dimethoxysilane,
(perhydroquinolino)(4-methylperhydroisoquinolino)
dimethoxysilane,
(perhydroquinolino)(5-methylperhydroisoquinolino)
dimethoxysilane,
(perhydroquinolino)(6-methylperhydroisoquinolino)
dimethoxysilane,
(perhydroquinolino)(7-methylperhydroisoquinolino)
dimethoxysilane,
(perhydroquinolino)(8-methylperhydroisoquinolino)
dimethoxysilane,
(perhydroquinolino)(9-methylperhydroisoquinolino)
dimethoxysilane,
(perhydroquinolino)(10-methylperhydroisoquinolino)
dimethoxysilane,
(2-methylperhydroquinolino)(perhydroisoquinolino)
dimethoxysilane,
(3-methylperhydroquinolino)(perhydroisoquinolino)
dimethoxysilane,
(4-methylperhydroquinolino)(perhydroisoquinolino)
dimethoxysilane,
(5-methylperhydroquinolino)(perhydroisoquinolino)
dimethoxysilane,
(6-methylperhydroquinolino)(perhydroisoquinolino)
dimethoxysilane,
(7-methylperhydroquinolino)(perhydroisoquinolino)
dimethoxysitane,
(8-methylperhydroquinolino)(perhydroisoquinolino)
dimethoxysilane,
(9-methylperhydroquinolino)(perhydroisoquinolino)
dimethoxysilane,
(10-methylperhydroquinolino)(perhydroisoquinolino)
dimethoxysilane,
(2-methylperhydroquinolino)(1-methylperhydroisoquinolino)dimethoxysilane,
(3-methylperhydroquinolino)(3-methylperhydroisoquinolino)dimethoxysilane,
(4-methylperhydroquinolino)(4-methylperhydroisoquinolino)dimethoxysilane,
(5-methytperhydroquinolino)(5-methylperhydroisoquinolino)dimethoxysilane,
(6-methylperhydroquinolino)(6-methylperhydroisoquinolino)dimethoxysilane,
(7-methylperhydropuinolino)(7-methylperhydroisoquinolino)dimehoxysilane,
(8-methylhydroquinolino)(8-methylhydroisoquinolino)
dimethoxysilane,
(9-methylhydroquinolino)(9-methylhydroisoquinolino)
dimethoxysilane,
(10-methylhydroquinolino)(10-methylhydroisoquinolino)dimethoxysilane and the like.

Among these compounds, (perhydroquinolino) (perhydroisoquinolino)dimethoxysilane is preferable.

Examples of the compounds represented by the general formula (12) include, bis(1,2,3,4-tetrahydroquinolino) dimethoxysilane and the like.

Examples of the compounds of bis(methyl-substituted-1, 2,3,4-tetrahydroquinolino)dimethoxysilane include, bis(2-methyl-1,2,3,4-tetrahydroquinolino)
dimethoxysilane,
bis(3-methyl-1,2,3,4-tetrahydroquinolino)
dimethoxysilane,
bis(4-methyl-1,2,3,4-tetrahydroquinolino)
dimethoxysilane.
bis(6-methyl-1,2,3,4-tetrahydroquinolino)
dimethoxysilane,
bis(7-methyl-1,2,3,4-tetrahydroquinolino)
dimethoxysilane,
bis(8-methyl-1,2,3,4-tetrahydroquinolino)
dimethoxysilane,
bis(9-methyl-1,2,3,4-tetrahydroquinolino)
dimethoxysilane and the like.

Examples of the compounds of bis(dimethyl-substituted-1,2,3,4-tetrahydroquinolino)dimethoxysilane include, bis(2,3-dimethyl-1,2,3,4-tetrahydroquinolino)
dimethoxysilane,
bis(2,4-dimethyl-1,2,3,4-tetrahydroquinolino)
dimethoxysilane,
bis(2,6-dimethyl-1,2,3,4-tetrahydroquinolino)
dimethoxysilane,
bis(2,7-dimethyl-1,2,3,4-tetrahydroquinolino)
dimethoxysilane,
bis(2,8-dimethyl-1,2,3,4-tetrahydroquinolino)
dimethoxysilane,
bis(2,9-dimethyl-1,2,3,4-tetrahydroquinolino)
dimethoxysilane,
bis(3,4-dimethyl-1,2,3,4-tetrahydroquinolino)
dimethoxysilane, bis(3,6-dimethyl-1,2,3,4-tetrahydroquinolino)dimethoxysilane,
bis(3,7-dimethyl-1,2,3,4-tetrahydroquinolino)dimethoxysilane,
bis(3,8-dimethyl-1,2,3,4-tetrahydroquindlino)dimethoxysilane,
bis(3,9-dimethyl-1,2,3,4-tetrahydroquinolino)dimethoxysilane,
bis(4,6-dimethyl-1,2,3,4-tetrahydroquinolino)dimethoxysilane,
bis(4,7-dimethyl-1,2,3,4-tetrahydroquinolino)dimethoxysilane,
bis(4,8-dimethyl-1,2,3,4-tetrahydroquinolino)dimethoxysilane,
bis(4,9-dimethyl-1,2,3,4-tetrahydroquinolino)dimethoxysilane,
bis(6,7-dimethyl-1,2,3,4-tetrahydroquinolino)dimethoxysilane,
bis(6,8-dimethyl-1,2,3,4-tetrahydroquinolino)dimethoxysilane,
bis(6,9-dimethyl-1,2,3,4-tetrahydroquinolino)dimethoxysilane,
bis(7,8-dimethyl-1,2,3,4-tetrahydroquinolino)dimethoxysilane,
bis(7,9-dimethyl-1,2,3,4-tetrahydroquinolino)dimethoxysilane,
bis(8,9-dimethyl-1,2,3,4-tetrahydroquinolino)dimethoxysilane and the like.

Examples of the compounds of bis(trimethyl-substituted-1,2,3,4-tetrahydroquinolino)dimethoxysilane include,
bis(2,3,4-trimethyl-1,2,3,4-tetrahydroqui-nolino)dimethoxysilane,
bis(2,3,6-trimethyl-1,2,3,4-tetrahydroquinolino)dimethoxysilane,
bis(2,3,7-trimethyl-1,2,3,4-tetrahydroquinolino)dimethoxysilane,
bis(2,3,8-trimethyl1,2,3,4-tetrahydroquinolino)dimethoxysilane,
bis(2,3,9-trimethyl-1,2,3,41-tetrahydroquinolino)dimethoxysilane,
bis(3,4,6-trimethyl-1,2,3,4-tet-rahydroquinortno)dimethoxysilane,
bis(3,4,7-trimethyl-1,2,3,4-tetrahydroquinolino)dimethoxysilane,
bis(3,4,8-trimethyl-1,2,3,4-tetrahydroquinolino)dimethoxysilane,
bis(3,4,9,-trimethyl-1,2,3,4-tetrahydroquinolino)dimethoxysilane,
bis(4,6,7-trimethyl-1,2,3,4-tetrahydroquinolino)dimethoxysilane,
bis(4,6,8-trimethyl-1,2,3,4-tetrahydroquinolino)dimethoxysilane,
bis(4,6,9-trimethyl-1,2,3,4-tetrahydroquinolino)dimethoxysilane,
bis(6,7,8-trimethyl-1,2,3,4-tetrahydroquinolino)dimethoxysilane,
bis(6,7,9-trimethyl-1,2,3,4-tetrahydroquinolino)dimethoxysilane,
bis(7,8,9-trimethyl-1,2,3,4-tetrahydroquinolino)dimethoxysilane and the like.

Examples of the compounds of bis(tetramethyl-substituted-1,2,3,4-tetrahydroquinolino)dimethoxysilane include, bis(2,3,4,6-tetramethyl-1,2,3,4-tetrahydroquinolino)dimethoxysilane,
bis(2,3,4,7-tetramethyl-1,2,3,4-tetrahydroquinolino)dimethoxysilane,
bis(2,3,4,8-tetramethyl-1,2,3,4-tetrahydroquinolino)dimethoxysilane,
bis(2,3,4,9-tetramethyl-1,2,3,4-tetrahydroquinolino)dimethoxysilane,
bis(3,4,6,7-tetramethyl-1,2,3,4-tetrahydroquinolino)dimethoxysilane,
bis(3,4,6,8,-tetramethyl-1,2,3,4-tetrahydroquinolino)dimethoxysilane,
bis(3,4,6,9,-tetramethyl-1,2,3,4-tetrahydroquinolino)dimethoxysilane,
bis(4,6,7,8,-tetramethyl-1,2,3,4-tetrahydroquinolino)dimethoxysilane,
bis(4,6,7,9,-tetramethyl-1,2,3,4-tetrahydroquinolino)dimethoxysilane,
bis(6,7,8,9-tetramethyl-1,2,3,4-tetrahydroquinolino)dimethoxysilane and the like.

Among these compounds, bis(1,2,3,4-tetrahydroquinolino)dimethoxysilane is preferred.

Examples of the organosilicon compounds represented by the general formula (5) include, the compounds represented by the general formula (15) or (16).

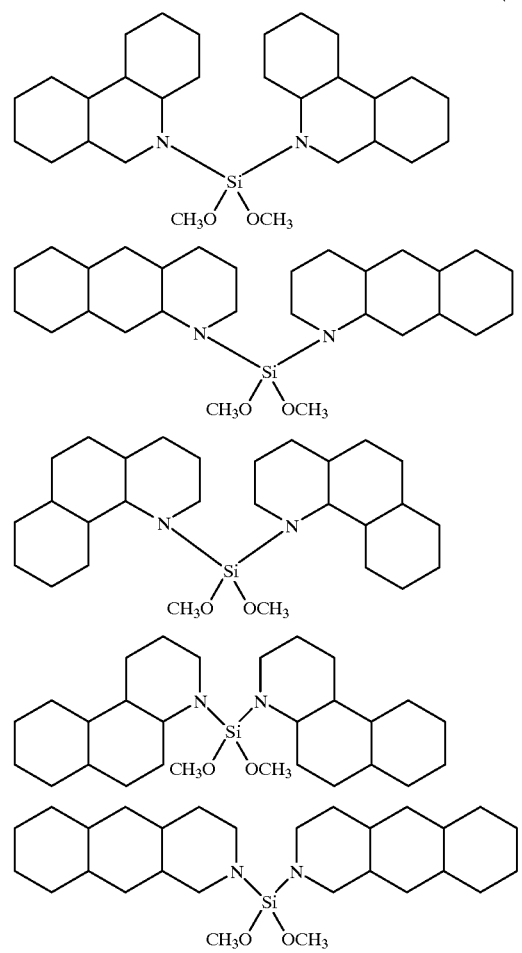

(15)

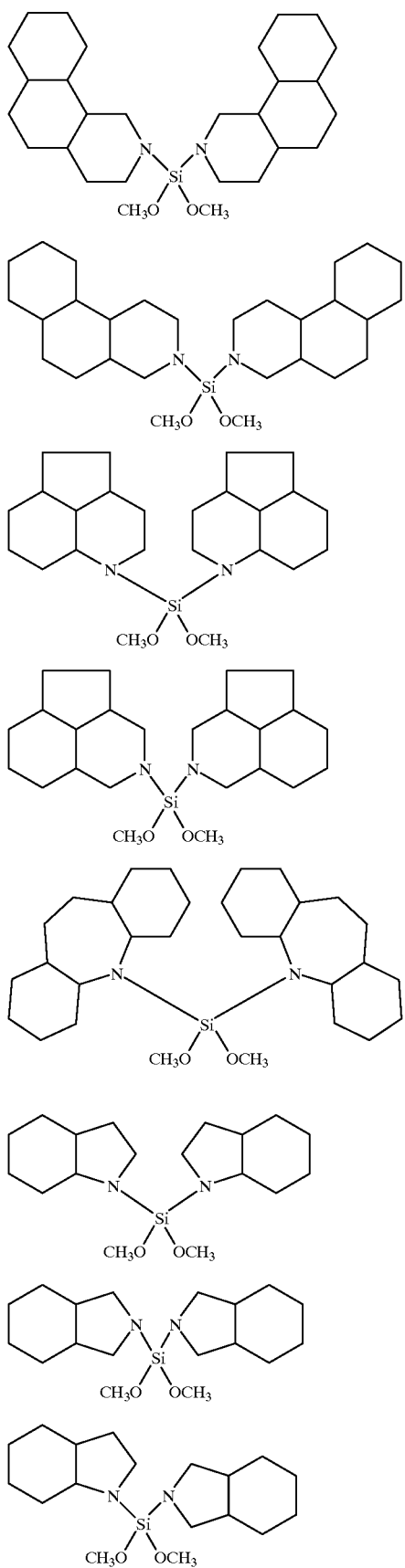
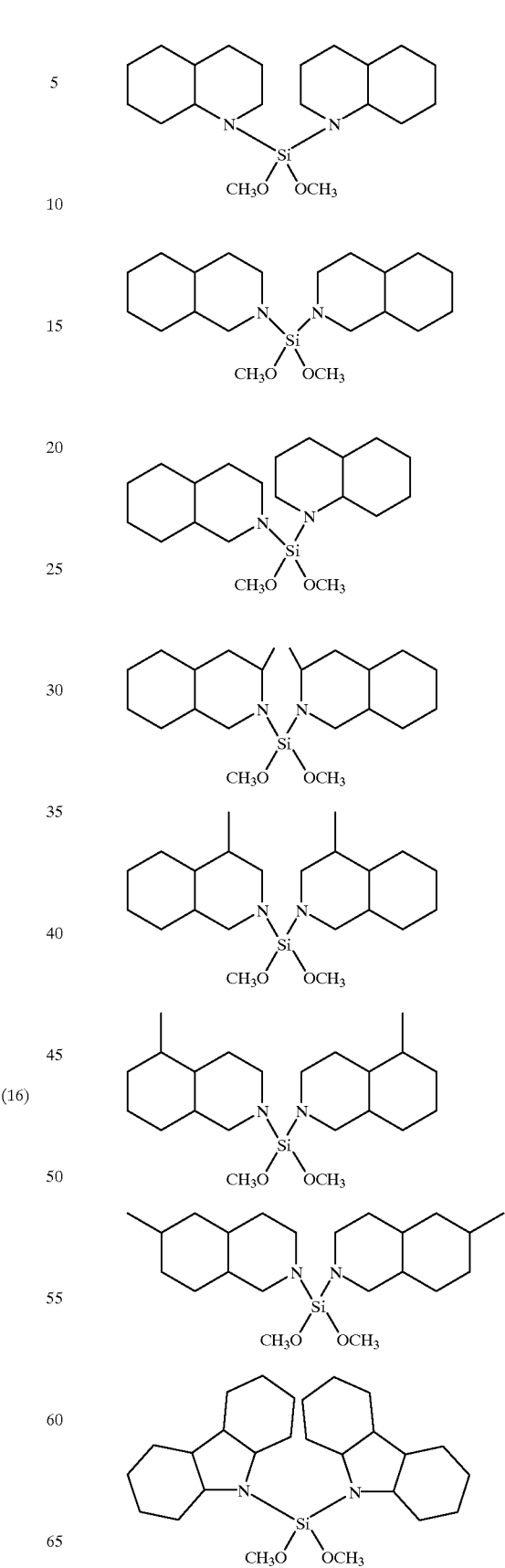

-continued

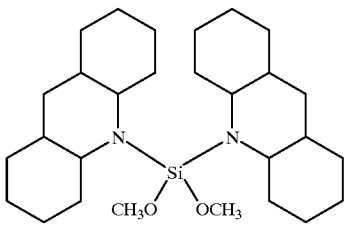

Examples of the organosilicon compounds represented by the general formula (6) include, the perhydroquinolino compounds represented by the general formula (17), the perhydroisoquinolino compounds represented by the general formula (18) and the like.

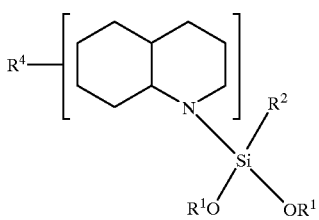
(17)

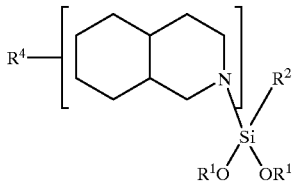
(18)

In the above formulas, $R^4$ represents a substituted group on the saturated, cyclic skeleton of the general formula $R^3N$ and is hydrogen atom, or a saturated or unsaturated aliphatic hydrocarbon group having 1 to 24 carbon atoms. The preferable examples includes hydrogen atom, methyl group, ethyl group, n-propyl group, iso-propyl group, n-butyl group, iso-butyl group, ter-butyl group, sec-butyl group, and the like. The number of hydrocarbon groups substituted on the saturated cyclic structure of $R^3N$ may be 1 or more.

Examples of the perhydroquinolinosilane compounds represented by the general formula (17) include,
  ethyl(perhydroquinolino)dimethoxysilane,
  n-propyl(perhydroquinolino)dimethoxysilane,
  iso-pro pyl(perhydroquinolino)dimethoxysilane,
  n-butyl(perhydroquinolino)dimethoxysilane,
  iso-butyl(perhydroquinolino)dimethoxysilane,
  ter-butyl(perhydroquinolino)dimethoxysilane,
  sec-butyl(perhydroquinolino)dimethoxysilane,
  n-pentyl(perhydroquinolino)dimethoxysilane,
  iso-pentyl(perhydroquinolino)dimethoxysilane,
  cyclopentyl(perhydroquinolino)dimethoxysilane,
  n-hextyl(perhydroquinolino)dimethoxysilane,
  cyclohextyl(perhydroquinolino)dimethoxysilane,
  thextyl(perhydroquinolino)dimethoxysilane,
  n-octyl(perhydroquinolino)dimethoxysilane,
  phenyl(perhydroquinolino)dimethoxysilane,
  piperidino(perhydroquinolino)dimethoxysilane,
  dimethylamino(perhydroquinolino)dimethoxysilane,
  iso-propoxy(perhydroquinolino)dimethoxysilane,
  ter-butoxy(perhydroquinolino)dimethoxysilane and the like.

Examples of the methyperhydroquinolinosilane compounds include,
  ethyl(2-methylperhydroquinolino)dimethoxysilane,
  n-propyl(2-methylperhydroquinolino)dimethoxysilane,
  iso-propyl(2-methylperhydroquinolino)dimethoxysilane,
  n-butyl(2-methylperhydroquinolino)dimethoxysilane,
  iso-butyl(2-methylperhydroquinolino)dimethoxysilane,
  ter-butyl(2-methylperhydroquinolino)dimethoxysilane,
  sec-butyl(2-methylperhydroquinolino)dimethoxysilane,
  n-pentyl(2-methylperhydroquinolino)dimethoxysilane,
  iso-pentyl(2-methylperhydroquinolino)dimethoxysilane,
  cyclopentyl(2-methylperhydroquinolino)dimethoxysilane,
  n-hextyl(2-methylperhydroquinolino)dimethoxysilane,
  cyclohextyl(2-methylperhydroquinolino)dimethoxysilane,
  thextyl(2-methylperhydroquinolino)dimethoxysilane,
  n-octyl(2-methylperhydroquinolino)dimethoxysilane,
  n-detyl(2-methylperhydroquinolino)dimethoxysilane,
  2-decalino(2-methylperhydroquinolino)dimethoxysilane,
  phenyl(2-methylperhydroquinolino)dimethoxysilane,
  iso-propyl(3-methylperhydroquinolino)dimethoxysilane,
  iso-propyl(4-methylperhydroquinolino)dimethoxysilane,
  iso-propyl(5-methylperhydroquinolino)dimethoxysilane,
  iso-propyl(6-methylperhydroquinolino)dimethoxysilane,
  iso-propyl(7-methylperhydroquinolino)dimethoxysilane,
  iso-propyl(8-methylperhydroquinolino)dimethoxysilane,
  iso-propyl(9-methylperhydroquinolino)dimethoxysilane,
  iso-propyl(10-methylperhydroquinolino)dimethoxysilane and the like.

Among the above-mentioned compounds,
  ethyl(perhydroquinolino)dimethoxysilane,
  n-propyl(perhydroquinolino)dimethoxysilane,
  iso-propyl(perhydroquinolino)dimethoxysilane,
  n-butyl(perhydroquinolino)dimethoxysilane,
  iso-butyl(perhydroquinolino)dimethoxysilane,
  ter-butyl(perhydroquinolino)dimethoxysilane,
  sec-butyl(perhydroquinolino)dimethoxysilane,
  cyclopentyl(perhydroquinolino)dimethoxysilane,
  n-hextyl(perhydroquinolino)dimethoxysilane,
  piperidino(perhydroquinolino)dimethoxysilane,
  ter-butoxy(perhydroquinolino)dimethoxysilane,
  diethylamino(perhydroquinolino)dimethoxysilane and the like are preferred.

Examples of the perhydroisoquinolinosilane compounds represented by the general formula (18) include,
  ethyl(perhydroisoquinolino)dimethoxysilane,
  n-propyl(perhydroisoquinolino)dimethoxysilane,
  iso-propyl(perhydroisoquinolino)dimethoxysilane,
  n-butyl(perhydroisoquinolino)dimethoxysilane,
  iso-butyl(perhydroisoquinolino)dimethoxysilane,
  ter-butyl(perhydroisoquinolino)dimethoxysilane,
  sec-butyl(perhydroisoquinolino)dimethoxysilane,
  n-pentyl(perhydroisoquinolino)dimethoxysilane,
  iso-pentyl(perhydroisoquinolino)dimethoxysilane, cyclopentyl(perhydroisoquinolino)dimethoxysilane,
n-hextyl(perhydroisoquinolino)dimethoxysilane,
cyclohextyl(perhydroisoquinolino)dimethoxysilane,
thextyl(perhydroisoquinolino)dimethoxysilane,
n-octyl(perhydroisoquinolino)dimethoxysilane,
n-detyl(perhydroisoquinolino)dimethoxysilane,
2-decalino(perhydroisoquinolino)dimethoxysilane,
phenyl(perhydroisoquinolino)dimethoxysilane,
piperidino(perhydroisoquinolino)dimethoxysilane,
dimethylamino(perhydroisoquinolino)dimethoxysilane,
iso-propoxy(perhydroisoquinolino)dimethoxysilane,
ter-butoxy(perhydroisoquinolino)dimethoxysilane and the like.

Examples of the methyperhydroisoquinolinosilane compounds include,
ethyl(2-methylperhydroisoquinolino)dimethoxysilane,
n-propyl(2-methylperhydroisoquinolino)dimethoxysilane,
iso-propyl(2-methylperhydroisoquinolino)dimethoxysilane,
n-butyl(2-methylperhydroisoquinolino)dimethoxysilane,
iso-butyl(2-methylperhydroisoquinolino)dimethoxysilane,
ter-butyl(2-methylperhydroisoquinolino)dimethoxysilane,
sec-butyl(2-methylperhydroisoquinolino)dimethoxysilane,
n-pentyl(2-methylperhydroisoquinolino)dimethoxysilane,
iso-pentyl(2-methylperhydroisoquinolino)dimethoxysilane,
cyclopentyl(2-methylperhydroisoquinolino)dimethoxysilane,
n-hextyl(2-methylperhydroisoquinolino)dimethoxysilane,
cyclohextyl(2-methylperhydroisoquinolino)dimethoxysilane,
thextyl(2-methylperhydroisoquinolino)dimethoxysilane,
n-octyl(2-methylperhydroisoquinolino)dimethoxysilane,
n-detyl(2-methylperhydroisoquinolino)dimethoxysilane,
2-decalino(2-methylperhydroisoquinolino)dimethoxysilane,
phenyl(2-methylperhydroisoquinolino)dimethoxysilane,
piperidino(2-methylperhydroisoquinolino)dimethoxysilane,
dimethylamino(2-methylperhydroisoquinolino)dimethoxysilane,
iso-propoxy(2-methylperhydroisoquinolino)dimethoxysilane,
ter-butoxy(2-methylperhydroisoquinolino)dimethoxysilane,
iso-propyl(3-methylperhydroisoquinolino)dimethoxysilane,
iso-propyl(4-methylperhydroisoquinolino)dimethoxysilane,
iso-propyl(5-methylperhydroisoquinolino)dimethoxysilane,
iso-propyl(6-methylperhydroisoquinolino)dimethoxysilane,
iso-propyl(7-methylperhydroisoquinolino)dimethoxysilane,
iso-propyl(8-methylperhydroisoquinolino)dimethoxysilane,
iso-propyl(9-methylperhydroisoquinolino)dimethoxysilane,
iso-propyl(10-methylperhydroisoquinolino)dimethoxysilane and the like.

Among the above-mentioned compounds,
ethyl(perhydroisoquinolino)dimethoxysilane,
n-propyl(perhydroisoquinolino)dimethoxysilane,
iso-propyl(perhydroisoquinolino)dimethoxysilane,
n-butyl(perhydroisoquinolino)dimethoxysilane,
iso-butyl(perhydroisoquinolino)dimethoxysilane,
ter-butyl(perhydroisoquinolino)dimethoxysilane,
sec-butyl(perhydroisoquinolino)dimethoxysilane,
cyclopentyl(perhydroisoquinolino)dimethoxysilane,
n-hextyl(perhydroisoquinolino)dimethoxysilane,
piperidino(perhydroisoquinolino)dimethoxysilane,
ter-butoxy(perhydroisoquinolino)dimethoxysilane,
diethylamino(perhydroisoquinolino)dimethoxysilane and the like are preferred.

Specific examples of the organosilicon compounds represent by the general formula (6) include a compound represented by the chemical structural formula (19) or (20).

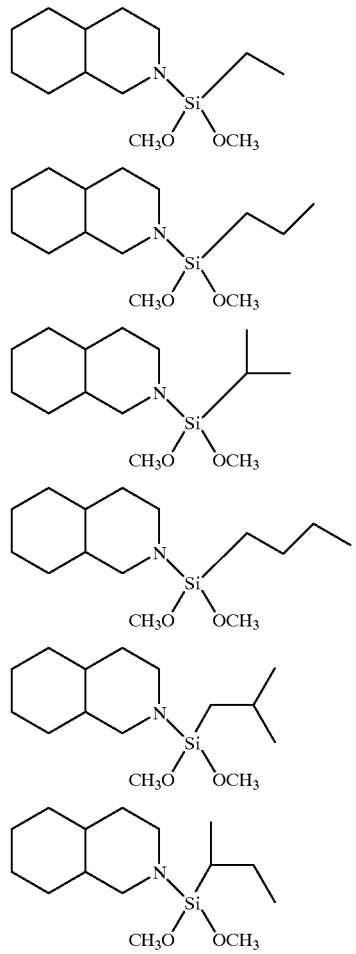

(19)

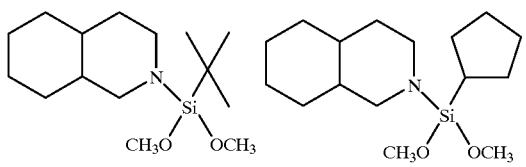
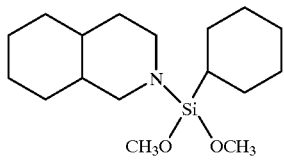
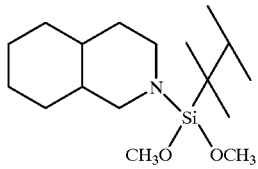
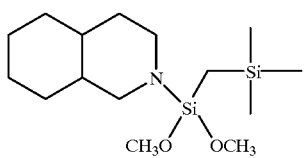
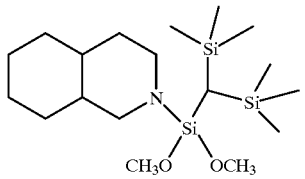
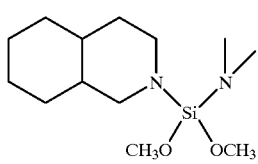
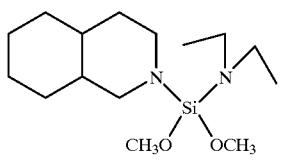
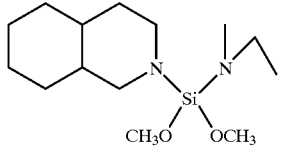
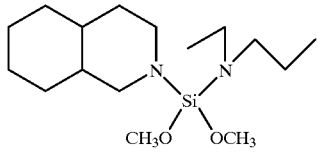
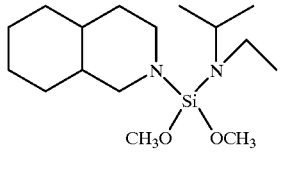

(20)

Examples of the above-mentioned organosilicon compounds having two saturated polycyclic amino groups have geometrical isomers since the polycyclic amino group may have a cis- or trans-isomer. That is, there exist isomers such as (trans-polycyclic amino)(trans-polycyclic amino)dialkoxysilane, (cis-polycyclic amino)(cis-polycyclic amino)dialkoxysilane, (trans-polycyclic amino)(cis-polycyclic amino)dialkoxysilane.

Specific examples thereof include, bis(trans-perhydroquinolino)dimethoxysilane, bis(cis-perhydroquinolino)dimethoxysilane, bis(trans-perhydroisoquinolino)dimethoxysilane, bis(cis-perhydroisoquinolino)dimethoxysilane.

Any of those isomers may be used as the constituent (D) in the present invention, singly or in the form of a mixture.

An organosilicon compound which is the catalyst constituent (D) represented by the formula (5) can be synthesized by reacting tetramethoxysilane or dichlorodimethoxysilane with 2 equivalent amounts of a magnesium salt or lithium salt of the secondary amine represented by the formula HNR. Further, the catalyst constituent (D) represented by the general formula (6) can be synthesized by reacting an alkyl trimethoxysilane or alkyl chlorodimethoxysilane with a magnesium salt or lithium salt of the secondary amine represented by the formula HNR.

The amount of the constituent (D) in the main polymerization is 0.01 to 1.0, preferably 0.05 to 0.5 in terms of atomic ratio (Si/Al) of silicon atom of the constituent (D) to aluminum atom of the constituent (B). Further, the molar ratio of the constituent (D) to the constituent (C) (constituent (D)/constituent (C)) is 1 to 200, preferably 50 to 150.

In the present invention, a mixture of the constituent (C) and the constituent (D) can be employed as an organosilicon compound used either in the prepolymerization or in the main polymerization, or bothin the prepolymerization and in the main polymerization. Further, a mixture of the constituent (C) and the constituent (D) can be employed as an organosilicon compound used in the main polymerization after the prepolymerization with the constituent (C). Also, a mixture of the constituent (C) and the constituent (D) can be employed as an organosilicon compound used in the prepolymerization followed by the main polymerization with the constituent (D).

The constituent (C) and the constituent (D) may be previously mixed and added to the polymerization system, or individual constituents may be added to the polymerization system. The mixing molar ratio of the constituent (C) to the constituent (D) (constituent (C)/constituent (D))is 0.01 to 2, preferably 0.02 to 1, more preferably 0.05 to 1.

In the present invention, the main polymerization method usable is a slurry polymerization using a non-polar solvent such as propane, butane, pentane, hexane, heptane, or octane; a gas-phase polymerization which comprises contacting a monomer in a gas state with a catalyst; a bulk polymerization in which polymerization is conducted in a liquid-state monomer as a solvent. In the above-mentioned method, either one of continuous polymerization and batchwise polymerization may be used In the main polymerization, polymerization pressure is generally 0.1 to 20 MPa, preferably 1 to 6 MPa; polymerization temperature is generally 10 to 150° C., preferably 30 to 100° C., more preferably 60 to 90° C.; and polymerization time is generally 0.1 to 10 hours, preferably 0.5 to 7 hours.

In the present invention, it is preferred that the main polymerization is conducted in the presence of the organoaluminum compound constituent (B). In this case, the amount of the constituent (B) in the main polymerization is 10 to 800, preferably 100 to 500 in terms of atomic ratio (Al/Ti) of aluminum atom of the constituent (B) to titanium atom of the solid catalyst constituent (A).

In the present invention, a chain transfer agent such as hydrogen or the like can be used. The amount of hydrogen required for preparation of an α-olefin polymer having desired levels of stereoregularity, melting point and molecular weight can be determined appropriately depending on the polymerization method and polymerization conditions. Generally, hydrogen is introduced to the polymerization system to keep it in the range of 0.05 to 3 in terms of hydrogen partial pressure.

In the present invention, α-olefin usable includes propylene, 1-butene, 1-hexene, 4-methyl-pentene, 1-octene and the like. In the prepolymerization, ethylene can be used as α-olefin. In the present invention, the polymerization of α-olefin can also be conducted by copolymerization with a small amount of ethylene or other α-olefin in order to lower the melting point for reducing the heat-sealing temperature of the objective film sheet, and to improve the transparency of the film.

Further, after polymerization and copolymerization of α-olefin, a block copolymer can be also prepared by copolymerizing α-olefin with ethylene in order to improve a low temperature impact strength of a molded article from the α-olefin polymer. In the present invention, an injection-molded product of the α-olefin polymer, α-olefin copolymer, and α-olefin ethylene block copolymer produced from the catalyst system including the new combination of the organosilicon compound constituents (C) and (D) has free from the problem relating to poor external appearance such as flow marks. For the molded products of the α-olefin polymer of the present invention, the occurrence rate of the flow marks is low independent of the properties such as molecular weight and ethylene content of α-olefin/ethylene copolymer in α-olefin ethylene block copolymer.

The catalyst system used in the present invention has high catalytic activities and high hydrogen sensibility. Further, the α-olefin polymer thus obtained has high stereoregularity and high melting point, and also has a broad molecular weight distribution. The molecular weight distribution in terms of a Mw/Mn ratio is 8 to 20. The Mw/Mn ratio is obtained by calculating from the weight average molecular weight Mw and the number average molecular weight Mn, both of which are measured by means of GPC (gel permeation chromatography) and obtained as the converted values of polystyrene. Moreover, a Mz/Mw ratio obtained by calculating from the Z average molecular weight Mz and the weight average molecular weight Mw is 5 to 10. That the Mz/Mw ratio is 5 to 10, means that super high molecular weight components are present and a molecular weight distribution curve obtained from the values measured by GPC slightly deviates from a normal distribution curve in a high molecular weight region.

Since the α-olefin polymer obtained by the method of the present invention has a broad molecular weight distribution, it has a high viscoelasticity and thus an excellent film-moldability; furthermore, an injection-molded product is free from the problem relating to poor external appearance such as flow marks. In the injection-molded product having α-olefin polymer obtained by the method of the present invention, the occurrence rates of flow marks on the molded product is 50 or less, preferably 40 or less, and is much less than of a prior product.

The α-olefin polymer obtained by the present invention can be used not only singly but also used as the material for compounding by blending with other plastics or elastomers. Further, the α-olefin polymer can be used together with a reinforcing agent of inorganic or organic fillers such as glass fibers, talc, or the like, as well as with an nucleating agent. Thus, the α-olefin polymer performs excellent characteristics as a construction material for automobiles and home electrical appliances, though the used thereof is not limited thereto.

In the present invention, an α-olefin is polymerized to prepare an α-olefin polymer having a high polymerization activity, high hydrogen sensibility, high stereoregularity, and broad molecular weight distribution. Further, by copolymerizing an α-olefin with ethylene or the other α-olefin, an α-olefin copolymer having a good randomness and high viscoelasticity can be prepared.

Since the α-olefin polymer prepared by the present invention has a molecular weight distribution which is similar range to that of an α-olefin polymer prepared by using a conventional titanium trichloride type catalyst which is called as a catalyst of the second-generation and has a low polymerization activity, it has good molding characteristics and the molded products are free from the problem relating to poor external appearance such as flow marks. Therefore, the catalyst system in the present invention can be usable as the substitution for the conventional titanium trichloride type catalyst. Thus, the catalyst system in the present invention is quite useful for simplifying the polymerization processes and reducing the production cost by eliminating the step previously needed for removing the residual catalyst from the polymer, i.e., a process for removing the ashes from the polymer using a large amount of an organic solvent.

EXAMPLES

The present invention will be explained by the following Examples and Comparative examples. However, the scope of the present invention is not restricted only to those EXAMPLES.

In the following EXAMPLES, the term (co) polymerization reaction rate means an yield (kg) of the (co) polymer obtained per 1 g of the solid catalyst.

Melt flow ratio (M.F.R.) is determined by measuring an amount by weight (g) of a polymer melted at a temperature of 230° C. and under load of 2.16 kg for 10 minutes in accordance with the method prescribed in ASTM-D1238. H.I means the ratio (%) of weight of insoluble polymer to prepared polymer, when extraction test of polymer is made by using boiled n-heptane for 6 hours.

Melting point (Tm) is measured by use of DSC (model:ASC-5200, manufactured by Seiko Denshi Kohgyo, Co.). As to the measuring conditions, 10 mg of propylene polymer is heated at temperature from 23° C. until 230° C. with a temperature gradient of 10° C. per minute, thereafter the polymer was kept as it is for 5 minutes, then the temperature was dropped from 230° C. until 40° C. with a temperature gradient of 5° C. per minute. The melting point is measured as a point that the polymer thus treated is remelted by heating from 40° C. until 230° C. by temperature gradient of 10° C. per minute.

Stereoregularity of polymer is determined from isopentad fraction (mmmm)(%) obtained by the microtacticity, which means one of the indications of stereoregularity of polymer is calculated from the ratio of peak strengths of $^{13}$C-NMR spectrum in accordance with the method described in "Macromolecules, Vol 8, page 687, (1975)". The $^{13}$C-NMR spectrum is measured by an apparatus of model EX400 (manufactured by JEOL Ltd.) at temperature of 130° C. and a number of scan of 800, by using TMS as the standard substance and o-dichlorobenzene as a solvent.

Molecular weight distribution of a polymer is calculated from the ratio (Mw/Mn) of weight-average molecular weight (Mw) and number-average molecular weight (Mn) and the rate(Mz/Mw) of z-average molecular weight (Mz) and weight-average molecular weight (Mw) which are determined by using polystyrene as the standard substance, an instrument of GPC (model:150CV type, manufactured by Waters, & Co.), o-dichlorobenzene as the solvent, column of SHODEX, temperature at 145° C., and concentration of 0.05% by weight.

Flow marks are a regular band-like unevenness appearing in the surface of molded products in the direction perpendicular to the flow direction of a molten polymer and are generated when a mold surface is not faithfully transferred to the surface of the molded products in an injection molding of an α-olefin polymer. Occurrence rate of the flow marks is determined from the values obtained by measuring with a ruler a distance between a gate of an injection molding machine and a flow mark starting point observed by naked eyes in an injection-molded article (n=3) with a size of 3 mm thickness×100 mm width×350 mm length. The flow mark starting point is a point where a flow mark begins to appear in the central portion of the molded article. The occurrence rate of the flow marks is determined by calculating three values according to the following formula and averaging them.

Occurrence rate of the flow marks={[350(mm)–Flow mark starting point(mm)]/350(mm)}×100

The lower the occurrence rate of the flow marks becomes, the more the result is preferable. Particularly, 40% or lower of the occurrence rate of the flow marks is preferred.

Synthesis of bis(perhydroisoquinolino)dimethoxysilane as an organosilicon compund constituent (D).

In a flask of 200 ml capacity being equipped with a dropping funnel, a stirrer piece was put therein, after replaced atmosphere in the flask with nitrogen gas by use of a vacuum pump, 100 ml of n-heptane which is distilled and dehydrated and 17.9 ml (0.12 mol) of decahydroisoquinolin were charged Into the dropping funnel, 75.0 ml (0.12 mol) of a hexane solution containing 1.6 mol/liter of n-butyllithium was placed. Keeping the flask at 4° C., the solution of butyllithium was added dropwise slowly to the flask, then the reaction mixture was stirred at room temperature for 12 hours to obtain lithium perhydroisoquinolide.

As to the next reaction system, into a flask of 400 ml capacity being equipped with a dropping funnel and attaching with a glass filter, was put a stirrer piece, after replaced atmosphere in the flask with nitrogen gas by use of a vaccum pump, 60 ml of n-heptane which is distilled and dehydrated and 9 ml (0.06 mol) of tetramethoxysilane were charged in the flask. Into the dropping funnel, lithium perhydroisoquinolide previously synthesized was placed. At room temperature, the lithium perhydroisoquinolide was added dropwise slowly into the flask, then the reaction mixture was stirred at 40° C. for 2 hours and at room temperature for 12 hours. After confirming that the desired product was formed sufficiently, the precipitates were separated by filtration using the glass filter. The resulting filtrate was purified by distillation to obtain bis-(perhydroisoquinolino) dimethoxysilane. Boiling point of the desired product was 180° C./1 mmHg, and the purity was 98.5% determined by use of a gas chromatography.

Example 1
(1) Preparation of Solid Catalyst Constituent (A)

15 mmol of anhydrous aluminum chloride was added to 40 ml of toluene, then 15 mmol of methyltriethoxysilane was added dropwise thereto under stirring. After the completion of the dropwise addition, the mixture was reacted at 25° C. for 1 hour. After, the reaction product was cooled to –5° C., then 18 ml of diisobutyl ether containing 30 mmol of butylmagnesium chloride was added dropwise to the reaction mixture under stirring, and temperature of the reaction mixture was kept at in the range of –5 to 0° C. After the completion of the dropwise addition, temperature of the reaction mixture was raised slowly, then reaction was continued at 30° C. for 1 hour. The sedimented solid was separated by filtration, and washed with-toluene and n-heptane. Next, 4.9 g of thus obtained solid was suspended in 30 ml of toluene, then 150 mmol of titanium tetrachloride and 3.5 mmol of di-n-heptyl phthalate were added to this suspension, and reacted under stirring at 90° C. for 1 hour. The solid was separated by filtration at the same temperature and washed with toluene, next with n-heptane. Again. the resulting solid was suspended in 30 ml of toluene, and 150 mmol of titanium tetrachloride was added, then reacted under stirring at 90° C. for 1 hour. The solid was separated by filtration at the same temperature, and washed with toluene, next with n-heptane. The resulting solid catalyst constituent contains 3.55 w % by weight of titanium. This solid was suspended in 80 ml of heptane to prepare a heptane slurry of the solid catalyst constituent.

(2) Prepolymerization 100 ml of distilled and desiccated n-heptane, 1.2 mmol of trimethylaluminum as an organoaluminum constituent (B), and 0.2 mmol of methyl(cyclohexyl)dimethoxysilane as an organosilicon constituent (C) were introduced into a flask of 200 ml capacity equipped with an agitator in turn. Then, a slurry of the catalyst solid constituent (A) obtained above in n-heptane was introduced 20 into the flask, and aged at a temperature of 23° C. for 10 minute. The amount of the catalyst solid constituent (A) was 0.3957 mmol as the converted values of titanium atom. At this time, a molar ratio of the constituent(A)/constituent(B)/constituent(C) was 1/3/0.5. After that, propylene gas was continuously introduced into the flask at a flow rate of 100 ml/min., and prepolymerization is conducted at a normal pressure for 10 minutes. The weight ratio of the obtained prepolymerized solid to the catalyst constituent (A) was 1.22.

(3) Polymerization of Propylene

A slurry of n-heptane containing the catalyst solid constituent obtained above in an amount of 0.005 mmol as the converted values of titanium atom, 2.2 mmol of triethylaluminum as an organoaluminum constituent (B), and 0.36 mmol of bis(perhydroisoquinolino)dimethoxysilane as a constituent (D) were introduced into an autoclave of 2 liters capacity equipped with an agitator in turn. Then, hydrogen gas at 0.12 Mpa and 1.2 liters of liquid propylene were introduced into the autoclave. The inside temperature of the autoclave was heated to 70° C. and kept at 70° C., and polymerization was conducted for 1 hour. After the completion of the polymerization, unreacted propylene gas was purged, and the resulting polymer was dried at 60° C. for 20 hours under a reduced pressure to obtain white powdery polypropylene. The result are shown in Table 1.

Example 2

(1) Preparation of Solid Catalyst Constituent (A)

150 mmol of anhydrous aluminum chloride was added to 400 ml of toluene, then 150 mmol of methyltriethoxysilane was added dropwise thereto under stirring. After the completion of the dropwise addition, the mixture was reacted at 25° C. for 1 hour. After, the reaction product was cooled to −5° C., then 180 ml of diisobutyl ether containing 300 mmol of butylmagnesium chloride was added dropwise to the reaction mixture under stirring, and temperature of the reaction mixture was kept at in the range of −5 to 0° C. After the completion of the dropwise addition, temperature of the reaction mixture was raised slowly, then reaction was continued at 30° C. for 1 hour. The precipitated solid was separated by filtration, and washed with toluene and n-heptane. Next, 50 g of thus obtained solid was suspended in 300 ml of toluene, then 1.5 mol of titanium tetrachloride and 33 mmol of di-n-heptyl phthalate were added to this suspension, and reacted under stirring at 90° C. for 1 hour. The solid was separated by filtration at the same temperature and washed with toluene, next with n-heptane. Again. the resulting solid was suspended in 300 ml of toluene, and 1.5 mol of titanium tetrachloride was added, then reacted under stirring at 90° C. for 1 hour. The solid was separated by filtration at the same temperature, and washed with toluene, next with n-heptane. The resulting solid catalyst constituent contains 3.33 w % by weight of titanium. This solid was suspended in 80 ml of heptane to prepare a heptane slurry of the solid catalyst constituent.

(2) Prepolymerization 4 liters of distilled and desiccated n-heptane, 39 mmol of trimethylaluminum as an organoaluminum constituent (B), 6.5 mmol of cyclohexyl(methyl)dimethoxysilane as an organosilicon constituent (C), and a slurry of n-heptane containing the catalyst solid constituent (A) obtained above in an amount of 13 mmol as the converted values of titanium atom were introduced into a prepolymerization vessel equipped with an agitator and sufficiently replaced with nitrogen gas. At this time, a molar ratio of the constituent(A)/constituent(B)/constituent(C) was 1/3/0.5. After that, 48 N liters of propylene gas was introduced into the vessel, and prepolymerization was conducted at 40° C. for 1 hour. The weight ratio of the obtained prepolymerized solid to the catalyst constituent (A) was 2.7.

(3) Polymerization of Propylene

Liquid propylene, the above-mentioned prepolymerization catalyst, triethylaluminum as an organoaluminum constituent (B), and bis(perhydroisoquinolino)dimethoxysilane as a constituent (D) were continuously introduced into a polymerization vessel of 600 liters capacity equipped with an agitator in flow rates of 77 kg/hr, 2.9 g/hr (1.2 mmol as the converted value of titanium atom), and 17 mmol/hr, respectively, and polymerization of propylene was conducted at 72° C. for 1 hour. At this time, A concentration of hydrogen in the polymerization system was adjusted such that MFR was 9±1(g/10 min). Various characteristics of the obtained propylene homopolymer were measured. The results are shown in Table 2.

(4) Pelletizing 0.1 weight part of Irgfos 168, 0.2 weight parts of Irgnox 1010, and 0.05 weight parts of calcium stearate were added as additives to 100 weight parts of the obtained propylene homopolymer. After the mixture was blended by Henschel mixer, it was pelletized at 220° C. by single-screw extruder with 60 mm diameter.

(5) Compounding 0.1 weight part of Irgfos 168, 0.3 weight parts of iron oxide, and 0.6 weight parts of titanium oxide were added as additives to a mixture of 80 weight parts of the obtained pellets and 20 weight parts of talc with average diameter of 2.5 μm. After the mixture was blended by tumbler mixer, it was pelletized by double-screw extruder.

(6) Injection Molding (Evaluation of flow marks)

The above obtained pellets were injection-molded by an injection molding machine, UBE-MAX D150-10 (trade name: manufactured by Ube Kosan Co., Ltd) equipped with a mold having 1 mm of side gate thickness, 2 mm of side gate width, 3 mm of thickness, 100 mm of width, and 350 mm of length. The molding condition was molding temperature: 40° C., resin temperature: 200° C., metering: rotation 70% (137rpm), injection pressure: 6 MPa, injection time: 10 seconds, cooling time: 30 seconds.

The occurrence rates of the molded products were measured (the lower occurrence rates, the more preferable), as shown in FIG. 2.

Example 3

Polymerization was conducted by the procedure similar to that of employed in Example 2, except that n-butyl(methyl) dimethoxysilane was used as the organosilicon compound constituent (C) in place of methyl(cyclohexyl) dimethoxysilane in preparation of the prepolymerization catalyst. The results are shown in Table 2.

Example 4

Polymerization was conducted by the procedure similar to that of employed in Example 2, except that di(n-butyl) dimethoxysilane was used as the organosilicon compound constituent (C) in place of cyclohexyl(methyl) dimethoxysilane in preparation of the prepolymerization catalyst. The results are shown in Table 2.

Example 5

Polymerization was conducted by the procedure similar to that of employed in Example 3, except that cyclopentyl (perhydroisoquinolino)dimethoxysilane was used as the constituent (D) in place of bis(perhydroisoquinolino) dimethoxysilane in polymerization of propylene. The results are shown in Table 2.

Example 6

Polymerization was conducted by the procedure similar to that of employed in Example 4, except that cyclopentyl (perhydroisoquinolino)dimethoxysilane was used as the constituent (D) in place of bis(perhydroisoquinolino) dimethoxysilane in polymerization of propylene. The results are shown in Table 2.

Example 7

Polymerization was conducted by the procedure similar to that of employed in Example 3, except that bis (perhydroquinolino)dimethoxysilane was used as the constituent (D) in place of bis(perhydroisoquinolino) dimethoxysilane in polymerization of propylene. The results are shown in Table 2.

Example 8

Polymerization was conducted by the procedure similar to that of employed in Example 4, except that bis (perhydroquinolino)dimethoxysilane was used as the constituent (D) in place of bis(perhydroisoquinolino) dimethoxysilane in polymerization of propylene. The results are shown in Table 2.

Comparative Example 1

Polymerization was conducted by the procedure similar to that of employed in Example 1, except that bis (perhydroisoquinolino)dimethoxysilane was used as the organosilicon compound constituent (C) in place of cyclohexyl(methyl)dimethoxysilane in prepolymerization. The results are shown in Table 1.

Comparative Example 2

Polymerization was conducted by the procedure similar to that of employed in Example 1, except that the constituent (C) was not used in prepolymerization. The results are shown in Table 1.

Comparative Example 3

Polymerization was conducted by the procedure similar to that of employed in Example 1, except that cyclohexyl (methyl)dimethoxysilane was used as the constituent (D) in place of bis(perhydroisoquinolino)dimethoxysilane in polymerization of propylene. The results are shown in Table 1.

Comparative Example 4

Polymerization was conducted by the procedure similar to that of employed in Example 2, except that cyclohexyl (methyl)dimethoxysilane was used as the constituent (D) in place of bis(perhydroisoquinolino)dimethoxysilane in polymerization of propylene. The results are shown in Table 2.

Example 9 (Mixture system in main polymerization)

A slurry of n-heptane containing the catalyst solid constituent obtained above in an amount of 0.005 mmol as the converted values of titanium atom, 2.2 mmol of triethylaluminum as an organoaluminum constituent (B), 0.02 mmol of di(n-butyl)dimethoxysilane as a constituent (C), and 0.34 mmol of bis(perhydroisoquinolino)dimethoxysilane as a constituent (D) were introduced into an autoclave of 2 liters capacity equipped with an agitator. Then, hydrogen gas at 0.12 Mpa and 1.2 liters of liquid propylene were introduced into the autoclave. Next, the autoclave was cooled to 10° C., the glass ampoule containing the solid catalyst constituent was crushed by start of agitation, and prepolymerization was conducted for 10 minutes.

After the prepolymerization, the inside temperature of the autoclave was heated to 70° C. and kept at 70° C., and polymerization was conducted for 1 hour. After the completion of the polymerization, unreacted propylene gas was purged, and the resulting polymer was dried at 60° C. for 20 hours under a reduced pressure to obtain white powdery polypropylene. The conditions and results are shown in Table 3.

Example 10

Polymerization was conducted by the procedure similar to that of employed in Example 9, except that 0.04 mmol of di(n-butyl)dimethoxysilane as a constituent (C), and 0.32 mmol of bis(perhydroisoquinolino)dimethoxysilane as a constituent (D) were introduced into the autoclave. The conditions and results are shown in Table 3.

Comparative Example 5

Polymerization was conducted by the procedure similar to that of employed in Example 1, except that 0.36 mmol of di(n-butyl)dimethoxysilane as the constituent (C), was introduced into the autoclave, and the constituent (D) was not used. The conditions and results are shown in Table 3.

TABLE 1

|  | polymerization activity Kg-PP/g-Cat. hr. | MFR g/10 min | H.I. % | Tm ° C. | Mw ×10$^{-4}$ | Mw/Mn | mmmm % |
|---|---|---|---|---|---|---|---|
| Example 1 | 29.8 | 27.6 | 96.7 | 162.0 | 31.1 | 17.6 | 97.8 |
| Comparative Example 1 | 30.4 | 15.1 | 96.6 | 162.6 | 39.8 | 18.0 | 98.0 |

TABLE 1-continued

|  | polymerization activity Kg-PP/g-Cat. hr. | MFR g/10 min | H.I. % | Tm °C. | Mw ×10⁻⁴ | Mw/Mn | mmmm % |
|---|---|---|---|---|---|---|---|
| Comparative Example 2 | 30.1 | 12.7 | 96.9 | 163.0 | 41.8 | 17.8 | 97.7 |
| Comparative Example 3 | 28.0 | 37.5 | 96.6 | 160.9 | 28.9 | 7.8 | 96.1 |

TABLE 2

|  | organosilicon compound | | log [MFR (C) /MFR(D)] | mmmm (D) /mmmm (C) | polymerization activity Kg-PP/g-Cat. hr. | MFR g/10 min | H.I. % | Tm °C. | Mw/Mn | Mz/Mw | mmmm % | occurrence rate of flow mark (%) |
|---|---|---|---|---|---|---|---|---|---|---|---|---|
|  | constituent [C] | constituent [D] | | | | | | | | | | |
| Example 2 | cyclohexyl(methyl)dimethoxysilane | bis(parhydroisequinolino)dimethoxysilane | 1.44 | 1.01 | 10.0 | 8.9 | 97.9 | 163.4 | 15.6 | 5.1 | 97.1 | 50 |
| Example 3 | methyl(n-butyl)dimethoxysilane | bis(perhydroisoquinolino)dimethoxysilane | 1.88 | 1.07 | 9.3 | 8.3 | 97.5 | 163.4 | 9.3 | 6.1 | 95.7 | 32 |
| Example 4 | di(n-butyl)dimethoxysilane | bis(perhydroisoquinolino)dimethoxysilane | 1.86 | 1.03 | 9.8 | 9.7 | 97.5 | 164.2 | 12.5 | 6.8 | 96.4 | 33 |
| Example 5 | methyl(n-butyl)dimethoxysilane | cyclopentyl(perhydroisoquinolino)dimethoxysilane | 1.71 | 1.07 | 11.5 | 8.8 | 97.7 | 164.3 | 13.3 | 5.7 | 96.0 | 38 |
| Example 6 | di(n-butyl)dimethoxysilane | cyclopentyl(perhydroisoquinolino)dimethoxysilane | 1.70 | 1.03 | 12.1 | 9.0 | 97.7 | 164.4 | 13.5 | 5.7 | 96.6 | 40 |
| Example 7 | methyl(n-butyl)dimethoxysilane | bis(perhydroisoquinolino)dimethoxysilane | 1.70 | 1.07 | 9.2 | 8.1 | 97.4 | 163.3 | 14.0 | 5.7 | 95.5 | 35 |
| Example 8 | di(n-butyl)dimethoxysilane | bis(perhydroquinolino)dimethoxysilane | 1.68 | 1.03 | 9.5 | 9.2 | 97.5 | 163.5 | 14.4 | 5.6 | 96.2 | 36 |
| Comparative Example 4 | cyclohexyl(methyl)dimethoxysilane | cyclopentyl(methyl)dimethoxysilane | — | — | 120 | 10.0 | 98.3 | 163.4 | 5.9 | 3.7 | 96.5 | 60 |

TABLE 3

|  | organosilicon compound | | [C]/[D] mol rate | log [MFR (C) /MFR (D)] | polymerization activity Kg-PP/G-Cat. hr. | MFR g/10 min. | HI % | Tm °C. | Mw ×10⁻⁴ | Mw/Mn | mmmm % |
|---|---|---|---|---|---|---|---|---|---|---|---|
|  | constituent [C] | constituent [D] | | | | | | | | | |
| Example 9 | di(n-butyl)dimethoxysilane | bis(perhydroisoquinolino)dimethoxysilane | 0.059 | 1.86 | 38.1 | 42.1 | 95.5 | 161.2 | 21.1 | 13.5 | 95.1 |
| Example 10 | di(n-butyl)dimethoxysilane | bis(perhydroisoquinolino)dimethoxysilane | 0.125 | 1.86 | 38.7 | 28.8 | 95.7 | 162.3 | 28.4 | 15.1 | 95.3 |
| Comparative Example 5 | di(n-butyl)dimethoxysilane | — | — | — | 41.2 | 94.8 | 95.0 | 159.9 | 18.0 | 6.4 | 94.7 |

The entire disclosure of Japanese Patent Applications No. 10-139987 filed on May 21, 1998 and No. 10-322708 filed on Nov. 12, 1998 including specification, claims, drawings and summary are incorporated herein by reference in its entirety.

What is claimed is:

1. A method for preparing an α-olefin polymer comprising the step of polymerizing or copolymerizing an α-olefin in the presence of a catalyst containing:

a solid catalyst constituent (A) which contains magnesium, titanium, a halogen element and an electron donor;

an organoaluminum compound constituent (B);

an organosilicon compound constituent (C) represented by the following general formula (1); and an organosilicon compound constituent (D) represented by the following general formulas (2) or (3) to prepare an α-olefin polymer $$R_nSi(OR)_{4-n} \quad (1)$$

wherein R is a hydrocarbon group having 1 to 8 carbon atoms, n is integer of 1 or 2

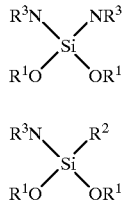

wherein $R^1$ is a hydrocarbon group having 1 to 8 atoms, $R^2$ is a hydrocarbon group having 1 to 8 carbons atoms, a hydrocarbylamino group having 2 to 24 carbons atoms, or a hydrocarbylalkoxy group having 1 to 24 carbon atoms, $R^3N$ is a perhydroquinolino group or a perhydroisoquinolino group.

2. The method according to claim 1, wherein said polymerizing or copolymerizing an α-olefin is comprising the steps of:

prepolymerizing an α-olefin in the presence of a catalyst containing said solid catalyst constituent (A), said organoaluminum compound constituent (B), and said organosilicon compound constituent (C); and main polymerizing or copolymerizing an α-olefin by adding said organosilicon compound constituent (D) to prepare an α-olefin polymer.

3. The method according to claim 1, wherein an amount of the organosilicon compound constituent (C) in the polymerization is 0.1 to 10 in terms of atomic ratio (Si/Ti) of silicon atom of the constituent (A), and 0.01 to 2 in terms of atomic ratio (Si/Al) of silicon atom of the constituent (C) to aluminum atom of the constituent (B).

4. The method according to claim 1, wherein the organosilicon compound constituents (C) and (D) are selected to satisfy the following formula:

$$1.3 \leq \log[MFR(C)/MFR(D)] \leq 4.0$$

wherein MFR(C) is a melt flow rate of proptlene homopolymer obtained by polymerization propylene in the presence of the constituents (A), (B), and (C), and MFR(D) is a melt flow rate of proplene homopolymer obtained by polymerizing proplene in the presence of the constituent (D) in stead of the constituent (C) in the same polymerizing condition as that conducted in the presence of the constituents (A), (B), and (C).

5. The method according to claim 1, wherein the organosilicon compound constituents (C) and (D) are selected to satisfy the following formulas:

$$0.96 < [mmmm(D)/mmmm(C)] \leq 1.1;$$

and $$96\% \leq mmmm(D)$$

wherein mmmm(C) is an isopentad fraction of polypropylene homopolymer obtained by polymerizing propylene in the presence of the consituents (A), (B), and (C), and mmmm(D) is an isopentad fraction of polypropylene homopolymer obtained by polymerizing propylene in the presence of the constiuent (D) in stead of the constituent (C) in the same polymerizing condition as that conducted in the presence of the constituents (A), (B), and (C).

* * * * *

UNITED STATES PATENT AND TRADEMARK OFFICE
CERTIFICATE OF CORRECTION

PATENT NO. : 6,376,628 B1
DATED : April 23, 2002
INVENTOR(S) : Shigeru Ikai et al.

It is certified that error appears in the above-identified patent and that said Letters Patent is hereby corrected as shown below:

Title page,
Item [56], References Cited, OTHER PUBLICATIONS, insert -- Shigeru Igai et al., "Polymerization of alpha-olefins with modified Ziegler Natta catalysts, organic aluminum compounds, and dicyclic amino dialkoxysilanes," *Chemical Abstracts*, Vol. 125, Columbus, Ohio, US: and JP 08 143621 A (UBE Industries, Japan) 4 June 1996 --.

Column 11,
Line 21, after "formula (11)," insert -- a --.

Column 13,
Line 8, "dimethbxysilane" should read -- dimethoxysilane --.
Between lines 25 and 26 insert:
-- bis(8, 10-dimethylperhydroquinolino)dimethoxysilane --.

Column 15,
Line 33, between "formula" and "(11)" delete period (.).

Column 27,
Line 41, after "used" insert period (.) (end of sentence).

Column 28,
Line 53, "with an nucleating" should read -- with a nucleating --.

Column 29,
Line 21, "an yield" should read -- a yield --.

Column 30,
Line 18, "compund" should read -- compound --.
Line 24, after "were charged" insert period (.).

Column 31,
Line 3, "Again. the" should read -- Again, the --.
Line 18, between "introduced" and "into" delete "20".
Line 44, "The result are" should read -- The results are --.
Line 65, "Again. the" should read -- Again, the --.

Column 32,
Line 31, "At this time, A" should read -- At this time, a --.

UNITED STATES PATENT AND TRADEMARK OFFICE
CERTIFICATE OF CORRECTION

PATENT NO. : 6,376,628 B1
DATED : April 23, 2002
INVENTOR(S) : Shigeru Ikai et al.

It is certified that error appears in the above-identified patent and that said Letters Patent is hereby corrected as shown below:

<u>Columns 35-36,</u>
Table 1-continued, last column, last row, "96.1" should read -- 96.4 --.
Table 2, column 6 entitled "polymerization activity" last row, "120" should read -- 12.0 --.

<u>Column 38,</u>
Line 9, "proptlene" should read -- propylene --.
Line 12, "rate of proplene" should read -- rate of propylene --.
Line 13, "proplene" should read -- propylene --.
Line 13, "(D) in stead)" should read -- (D) instead --.
Line 32, "constiuent" should read -- constituent --.
Line 32, "(D) in stead" should read -- (D) instead --.

Signed and Sealed this

Twenty-ninth Day of October, 2002

Attest:

JAMES E. ROGAN
*Attesting Officer*   *Director of the United States Patent and Trademark Office*